(12) United States Patent
Kobayashi et al.

(10) Patent No.: US 10,739,905 B2
(45) Date of Patent: Aug. 11, 2020

(54) SENSOR-EQUIPPED DISPLAY DEVICE

(71) Applicant: Japan Display Inc., Tokyo (JP)

(72) Inventors: Kazuyuki Kobayashi, Tokyo (JP); Hayato Kurasawa, Tokyo (JP); Hiroshi Mizuhashi, Tokyo (JP); Masaya Tamaki, Tokyo (JP); Takeo Koito, Tokyo (JP); Koji Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/124,355

(22) Filed: Sep. 7, 2018

(65) Prior Publication Data
US 2019/0018537 A1 Jan. 17, 2019

Related U.S. Application Data

(63) Continuation of application No. 15/162,771, filed on May 24, 2016, now Pat. No. 10,152,168.

(30) Foreign Application Priority Data

May 29, 2015 (JP) ................................. 2015-110731

(51) Int. Cl.
*G06F 3/041* (2006.01)
*G06F 3/044* (2006.01)
(Continued)

(52) U.S. Cl.
CPC ........... *G06F 3/0416* (2013.01); *G02B 6/005* (2013.01); *G02B 6/0051* (2013.01);
(Continued)

(58) Field of Classification Search
None
See application file for complete search history.

(56) References Cited

U.S. PATENT DOCUMENTS 9,711,536 B2 * 7/2017 Takahashi ............ G09G 3/3688
9,952,724 B2 * 4/2018 Akimoto ............... G09G 3/3648
(Continued)

FOREIGN PATENT DOCUMENTS

CN 102376286 A 3/2012
CN 101446869 B 9/2013
(Continued)

OTHER PUBLICATIONS

Notification of Reasons for Refusal issued in connection with counterpart Japanese Patent Application No. 2015-110731, dated Sep. 25, 2018.
(Continued)

*Primary Examiner* — Andre L Matthews
(74) *Attorney, Agent, or Firm* — K&L Gates LLP

(57) ABSTRACT

According to one embodiment, a sensor-equipped display device includes a display panel, a detection electrode, a conductive member arranged at intervals from the display panel and the detection electrode, and controller. In a first sense period, the controller drives a common electrode of the display panel or the detection electrode and extracts input position data from the detection electrode. In a second sense period, the controller drives the conductive member and extracts first input pressure data from a first electrode, the controller drives a second electrode and extracts second input pressure data from the conductive member, or the controller drives a third electrode and extracts third input pressure data from the third electrode.

5 Claims, 29 Drawing Sheets

(51) Int. Cl.
*G09G 3/36* (2006.01)
*F21V 8/00* (2006.01)

(52) U.S. Cl.
CPC ........... *G02B 6/0053* (2013.01); *G06F 3/044* (2013.01); *G06F 3/0412* (2013.01); *G09G 3/3648* (2013.01); *G09G 3/3655* (2013.01); *G06F 2203/04101* (2013.01); *G09G 3/3688* (2013.01); *G09G 2300/0426* (2013.01); *G09G 2310/0297* (2013.01)

(56) References Cited

U.S. PATENT DOCUMENTS

| | | | |
|---|---|---|---|
| 2007/0229464 | A1 | 10/2007 | Hotelling et al. |
| 2007/0236466 | A1 | 10/2007 | Hotelling |
| 2009/0231305 | A1 | 9/2009 | Hotelling et al. |
| 2010/0085326 | A1* | 4/2010 | Anno ................. G06F 3/044 345/174 |
| 2013/0033450 | A1* | 2/2013 | Coulson ............... G06F 3/044 345/174 |
| 2013/0335367 | A1* | 12/2013 | Kim ................... G09G 3/3696 345/174 |
| 2014/0002113 | A1 | 1/2014 | Schediwy et al. |
| 2014/0036166 | A1* | 2/2014 | Kurasawa ........... G02F 1/13338 349/12 |
| 2015/0286332 | A1 | 10/2015 | Hotelling et al. |
| 2015/0323843 | A1* | 11/2015 | Park .................... G02F 1/13439 362/607 |
| 2016/0098131 | A1* | 4/2016 | Ogata ................. G06F 1/1643 345/173 |

FOREIGN PATENT DOCUMENTS

| | | |
|---|---|---|
| JP | 2007-199724 | 8/2007 |
| JP | 2009-169523 | 7/2009 |
| JP | 2009-276821 | 11/2009 |
| JP | 2012-195010 | 10/2012 |
| JP | 2014-194591 A | 10/2014 |
| JP | 2014-209297 A | 11/2014 |
| JP | 2015-005231 A | 1/2015 |
| KR | 10-2013-0141134 A | 12/2013 |
| TW | 201409117 A | 3/2014 |
| TW | 201411464 A | 3/2014 |
| TW | 484455 B | 5/2015 |
| WO | 2011/125373 A1 | 10/2011 |
| WO | 2014/080924 A1 | 5/2014 |
| WO | 2014/092758 A1 | 6/2014 |
| WO | 2015/022938 A1 | 2/2015 |

OTHER PUBLICATIONS

Office Action issued in connection with Korean Patent Application No. 10-2016-0063401, dated Dec. 15, 2017. (11 pages).
Taiwan Patent Office, Office Action issued in corresponding Taiwanese patent application, dated Apr. 14, 2017.
Japanese Office Action dated Oct. 1, 2019 in corresponding Japanese Application No. 2018-217267.

* cited by examiner

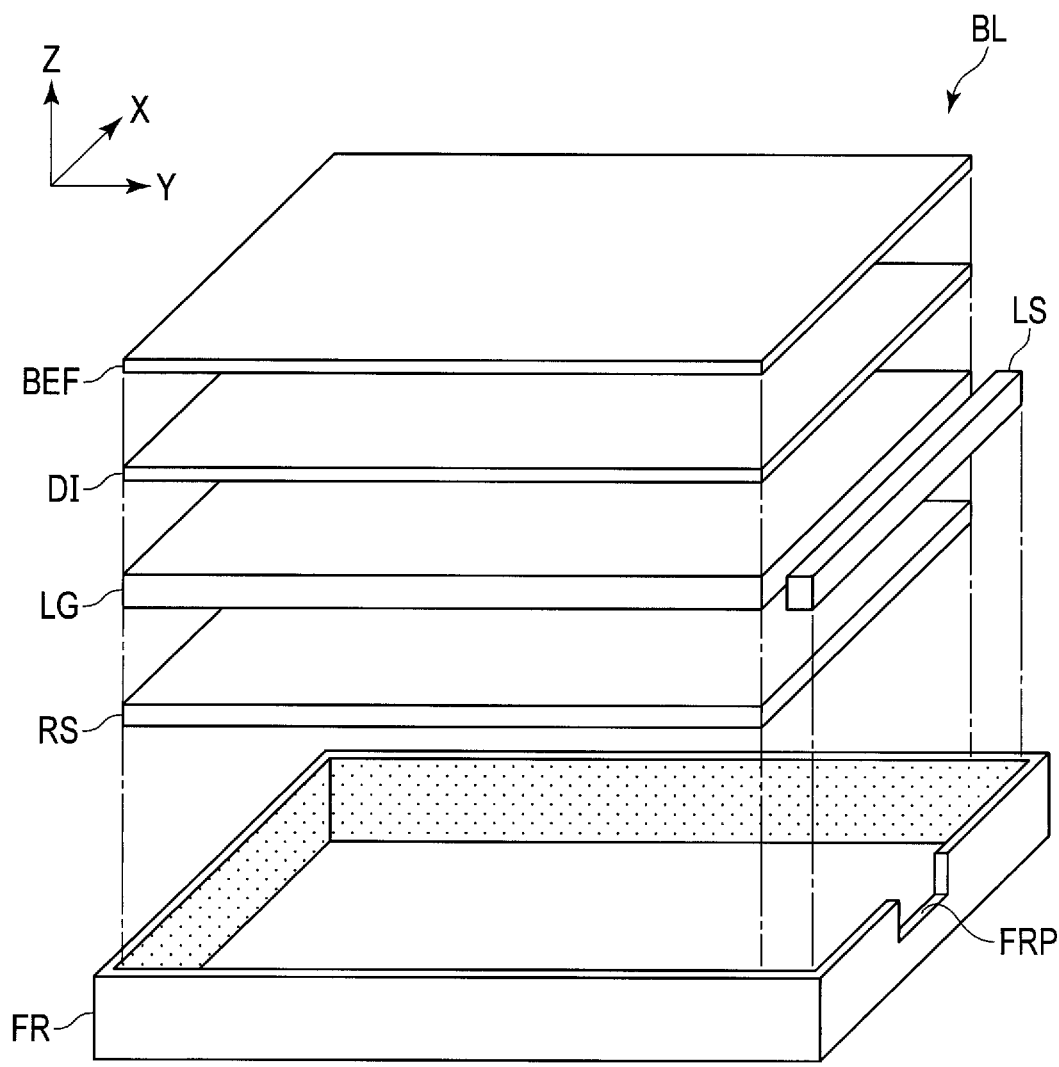
F I G. 2

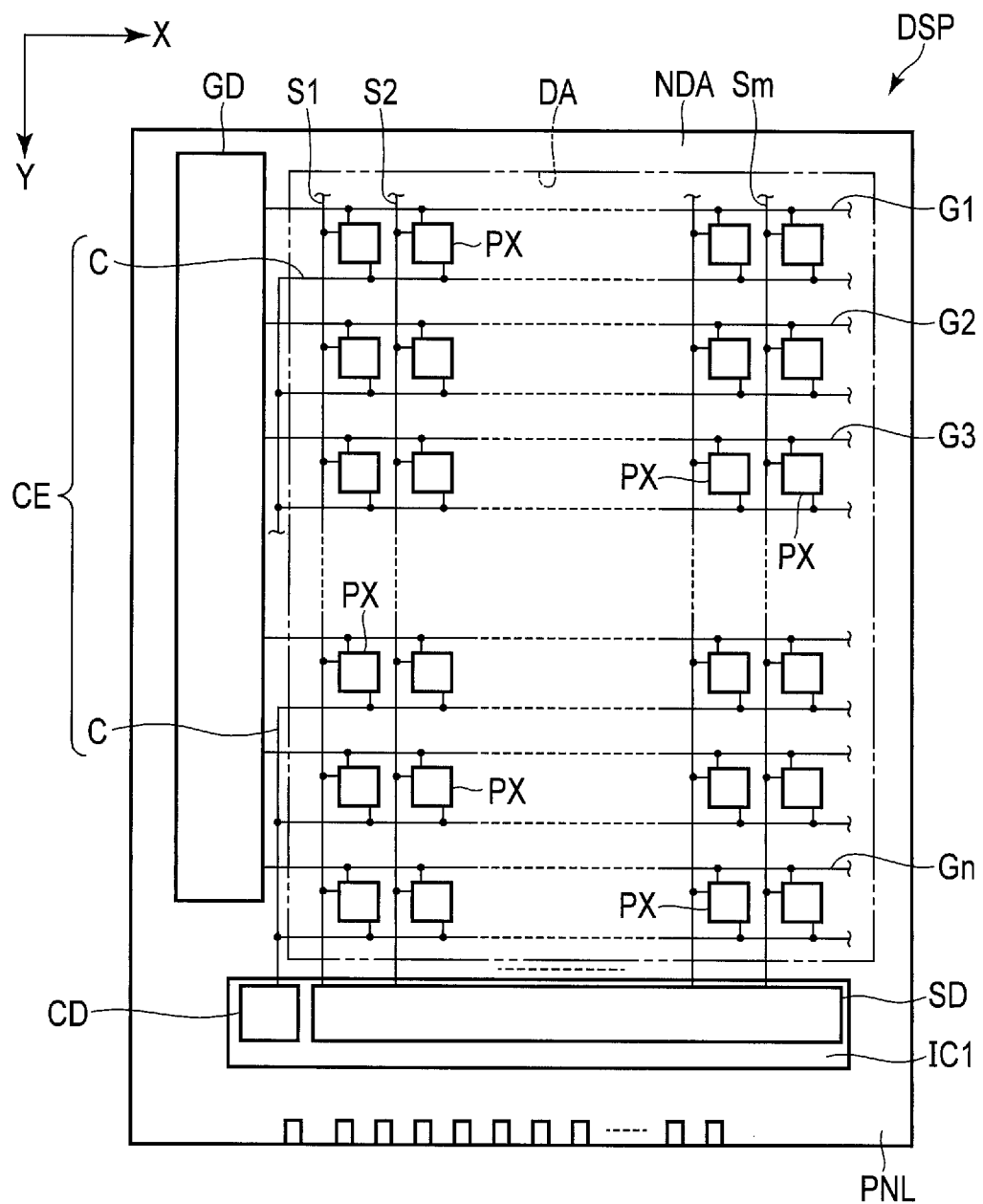
F I G. 5

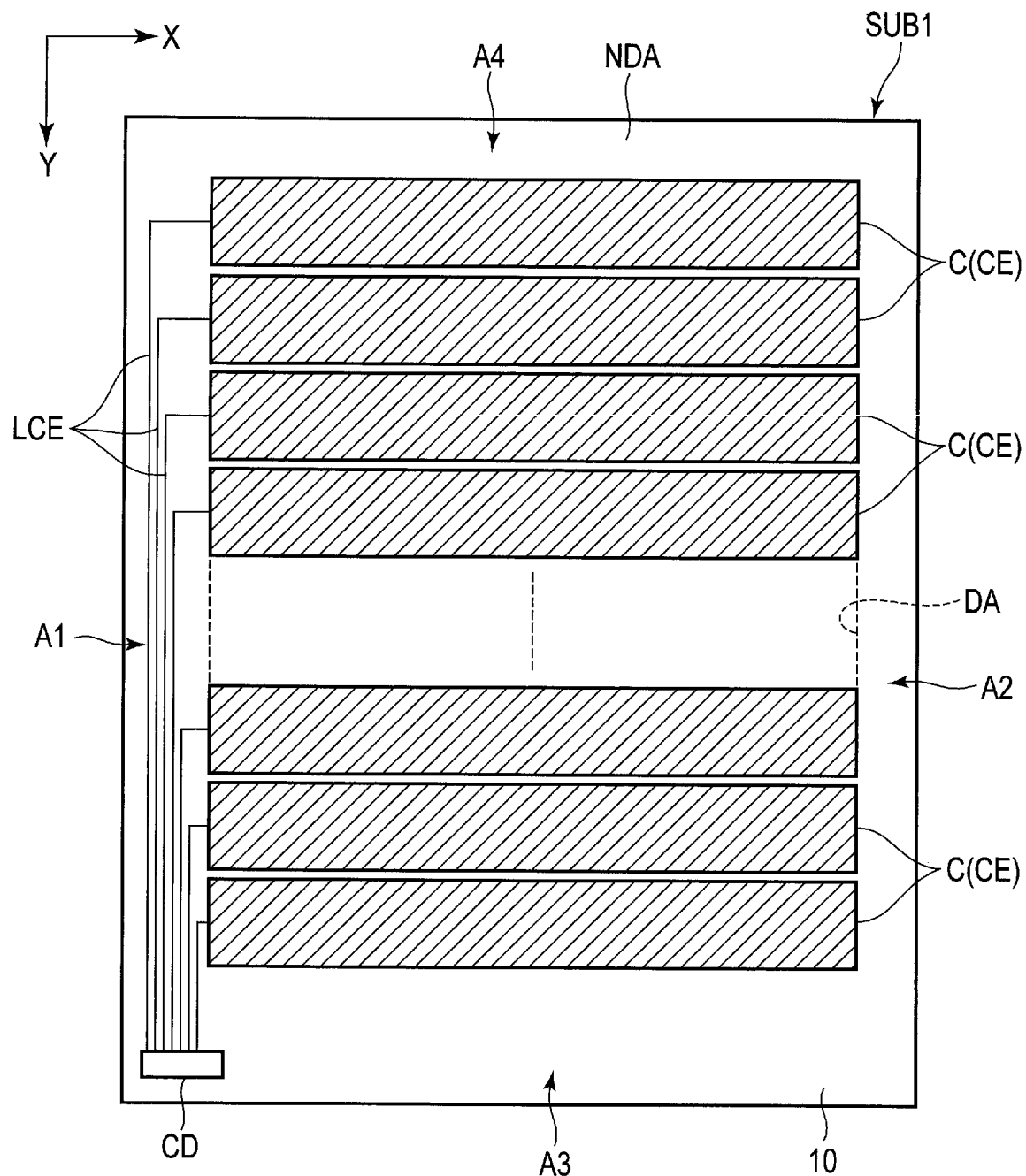
F I G. 7

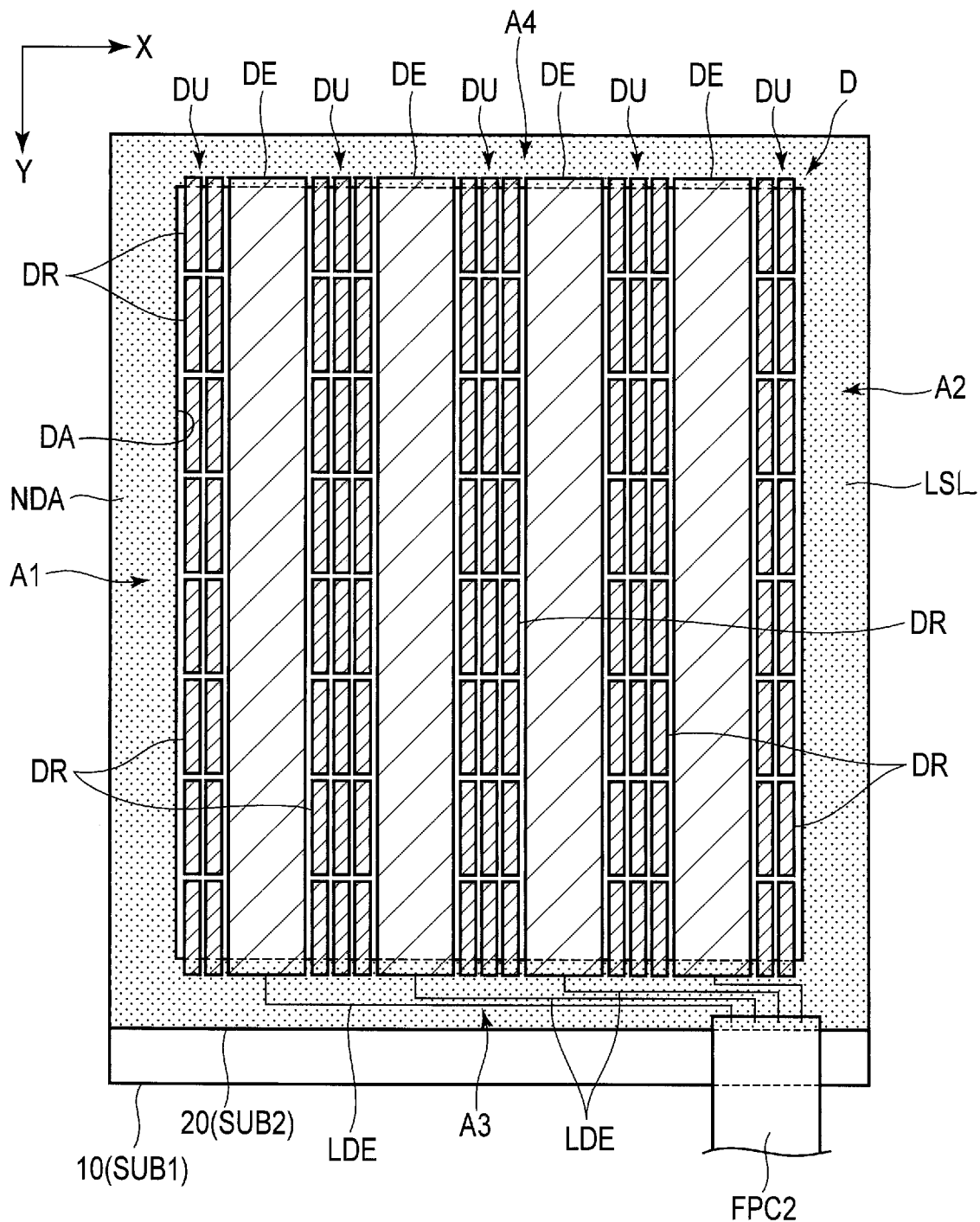
F I G. 8

| Period | Operation | Mode | Method |
|---|---|---|---|
| Display period | Display drive | — | — |
| Sense period (touch period) | First sense drive (position detection) | First mode (self-capacitive sensing mode) | — |
| | | Second mode (mutual-capacitive sensing mode) | — |
| | Second sense drive (pressure detection) | First mode (self-capacitive sensing mode) | — |
| | | Second mode (mutual-capacitive sensing mode) | First method |
| | | | Second method |

FIG. 9

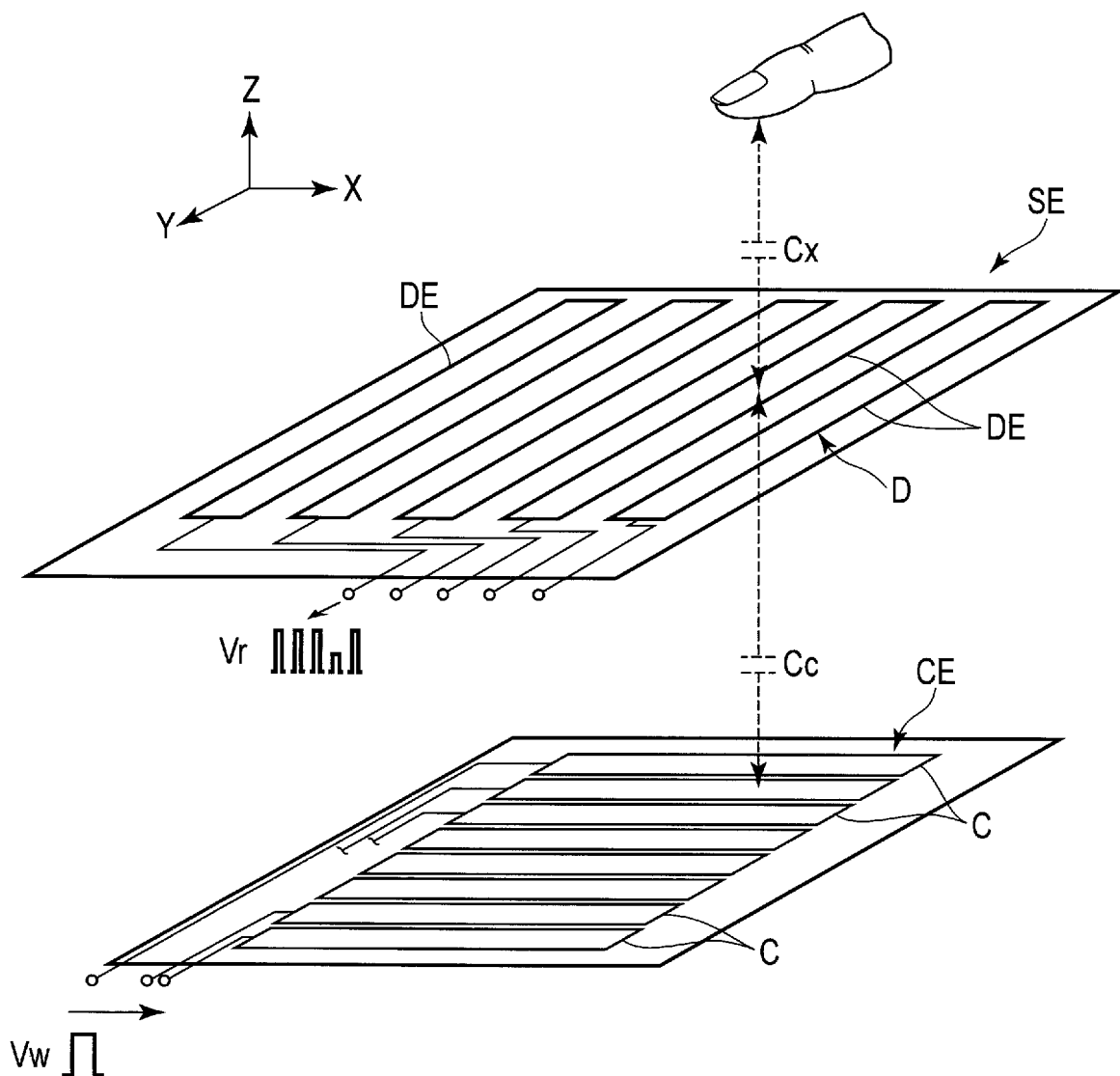
F I G. 11

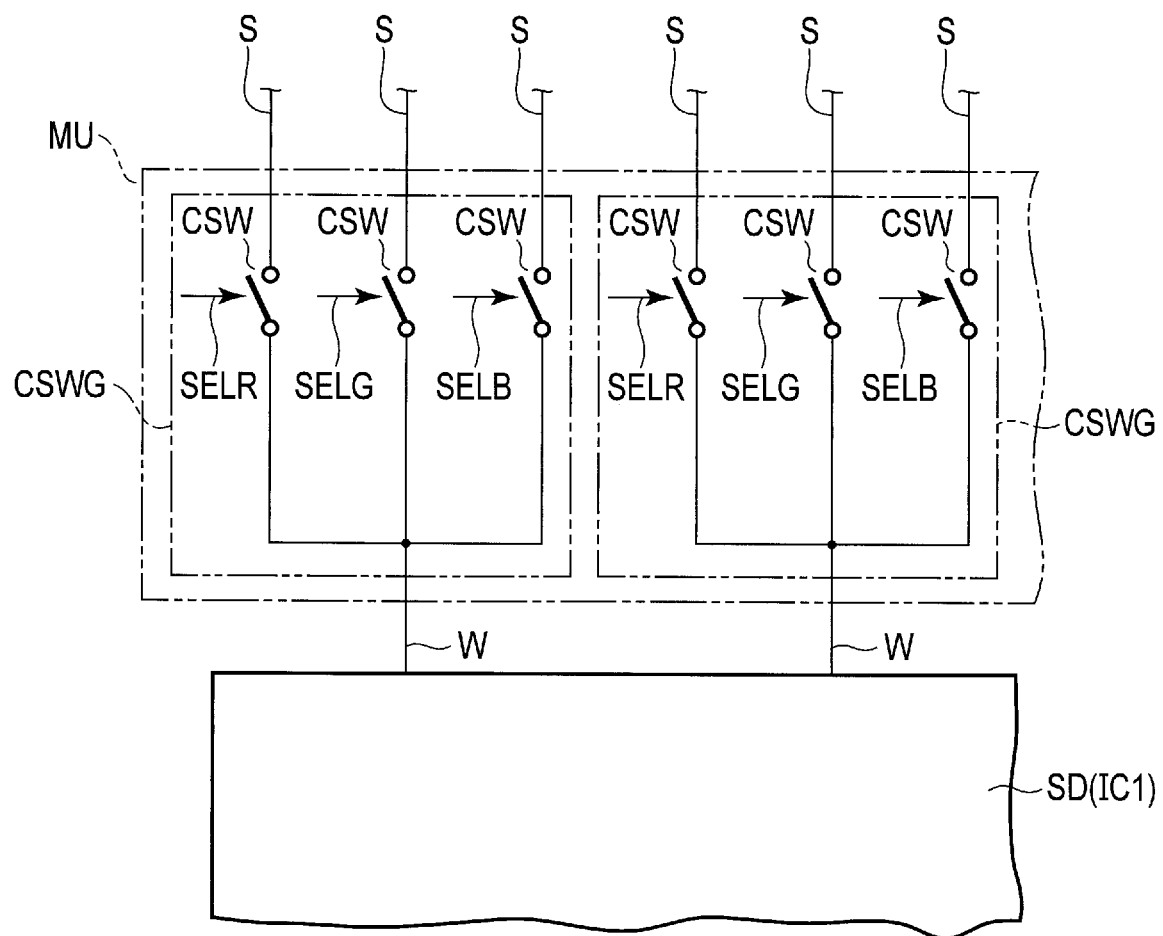
F I G. 12

| | Second sensing in second mode (first method) | |
|---|---|---|
| Target Rx2 of extraction of pressure data | (1) Sensor electrode SEE located on side of cover member CG opposed to second substrate SUB2 and different from detection electrodes DE | CG |
| | (2) Detection electrodes DE | PNL |
| | (3) Sensor electrode SEE located on side of second insulating substrate 20 opposed to cover member CG and different from detection electrodes DE | |
| | (4) Sensor electrode SEE located on side of second insulating substrate 20 opposed to first substrate SUB1 | |
| | (5) Common electrode CE | |
| | (6) Sensor electrode SEE located on side of first insulating substrate 10 opposed to second substrate SUB2 and different from common electrode CE | |
| | (7) Sensor electrode SEE located on side of first insulating substrate 10 opposed to backlight unit BL | |
| | Select any one of (1) to (7) | |
| Target Tx2 of drive (conductive member CON) | (8) Conductive layer on side of brightness enhancement film BEF opposed to liquid crystal display panel PNL | BL |
| | (9) Conductive layer between brightness enhancement film BEF and light diffusion sheet DI | |
| | (10) Conductive layer between light diffusion sheet DI and light guide LG | |
| | (11) Conductive layer between light guide LG and light reflector RS | |
| | (12) Conductive layer on side of light reflector RS opposed to casing CA | |
| | (13) Frame FR | |
| | (14) Casing CA | CA |
| | Select any one of (8) to (14) | |

F I G. 13

| | | CG / PNL / BL / CA |
|---|---|---|
| | Second sensing in second mode (second method) | |
| Target Tx2 of drive | (1) Sensor electrode SEE located on side of cover member CG opposed to second substrate SUB2 and different from detection electrodes DE | |
| | (2) Detection electrodes DE | |
| | (3) Sensor electrode SEE located on side of second insulating substrate 20 opposed to cover member CG and different from detection electrodes DE | |
| | (4) Sensor electrode SEE located on side of second insulating substrate 20 opposed to first substrate SUB1 | |
| | (5) Common electrode CE | |
| | (6) Sensor electrode SEE located on side of first insulating substrate 10 opposed to second substrate SUB2 and different from common electrode CE | |
| | (7) Sensor electrode SEE located on side of first insulating substrate 10 opposed to backlight unit BL | |
| | Select any one of (1) to (7) | |
| Target Rx2 of extraction of pressure data (conductive member CON) | (8) Conductive layer on side of brightness enhancement film BEF opposed to liquid crystal display panel PNL | |
| | (9) Conductive layer between brightness enhancement film BEF and light diffusion sheet DI | |
| | (10) Conductive layer between light diffusion sheet DI and light guide LG | |
| | (11) Conductive layer between light guide LG and light reflector RS | |
| | (12) Conductive layer on side of light reflector RS opposed to casing CA | |
| | (13) Frame FR | |
| | (14) Casing CA | |
| | Select any one of (8) to (14) | |

FIG. 14

| Target Tx2 of drive and target Rx2 of extraction of pressure data (Tx2 = Rx2) | Second sensing in first mode |
|---|---|
| | (1) Sensor electrode SEE located on side of cover member CG opposed to second substrate SUB2 and different from detection electrodes DE — CG |
| | (2) Detection electrodes DE — PNL |
| | (3) Sensor electrode SEE located on side of second insulating substrate 20 opposed to cover member CG and different from detection electrodes DE |
| | (4) Sensor electrode SEE located on side of second insulating substrate 20 opposed to first substrate SUB1 |
| | (5) Common electrode CE |
| | (6) Sensor electrode SEE located on side of first insulating substrate 10 opposed to second substrate SUB2 and different from common electrode CE |
| | (7) Sensor electrode SEE located on side of first insulating substrate 10 opposed to backlight unit BL |
| | Select any one of (1) to (7) |
| Target of ground potential (conductive member CON) | (8) Conductive layer on side of brightness enhancement film BEF opposed to liquid crystal display panel PNL — BL |
| | (9) Conductive layer between brightness enhancement film BEF and light diffusion sheet DI |
| | (10) Conductive layer between light diffusion sheet DI and light guide LG |
| | (11) Conductive layer between light guide LG and light reflector RS |
| | (12) Conductive layer on side of light reflector RS opposed to casing CA |
| | (13) Frame FR |
| | (14) Casing CA — CA |
| | Select any one of (8) to (14) |

F I G. 15

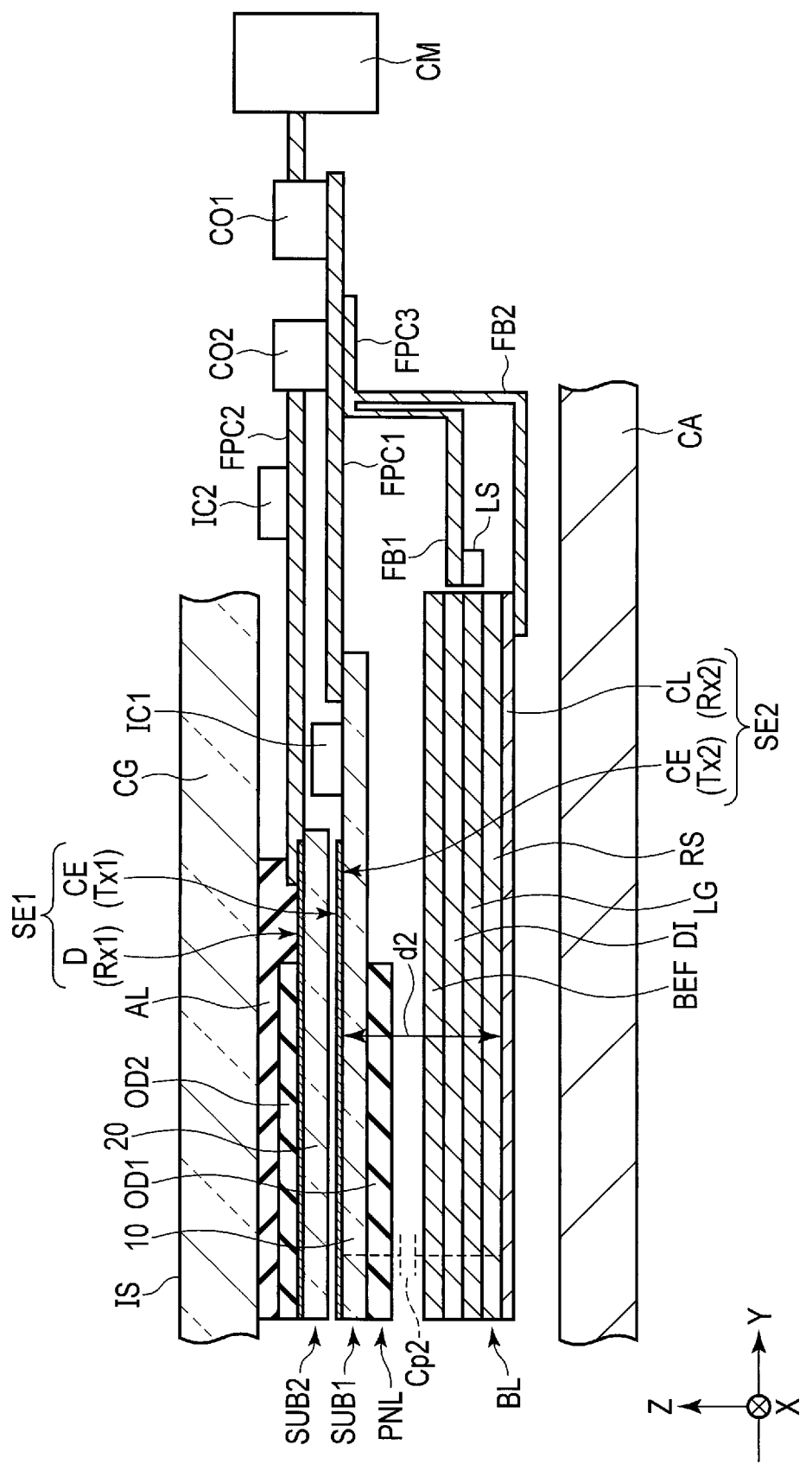
F I G. 16

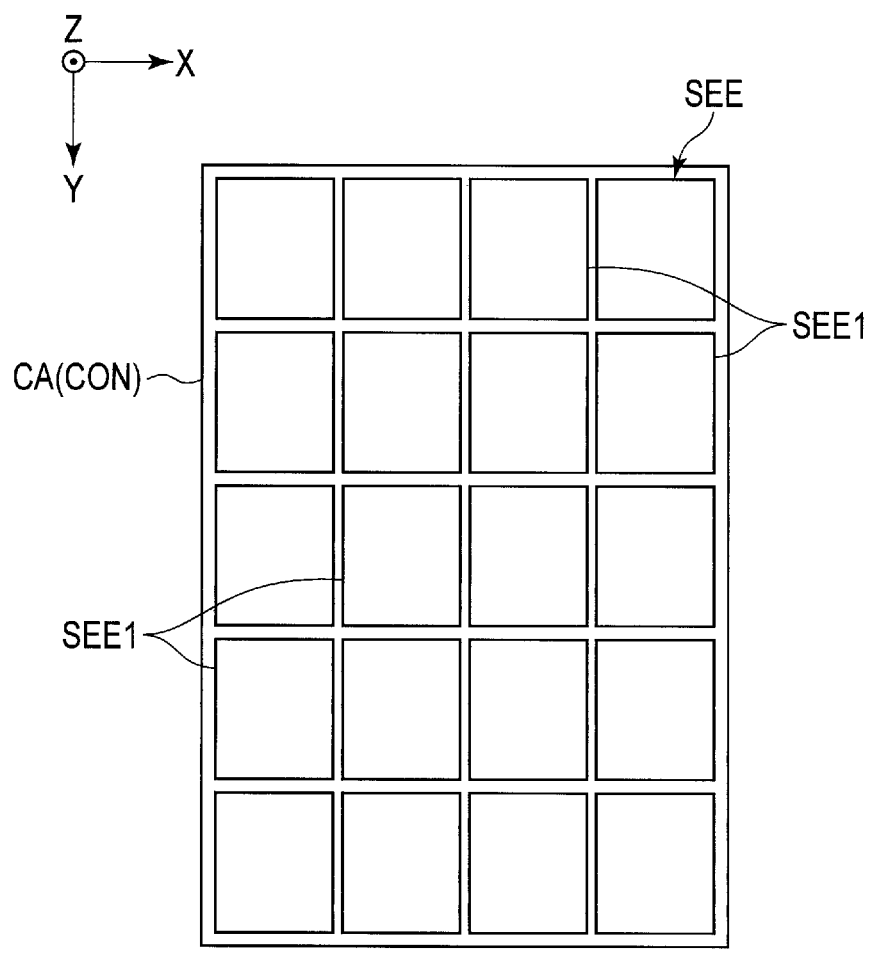
F I G. 24

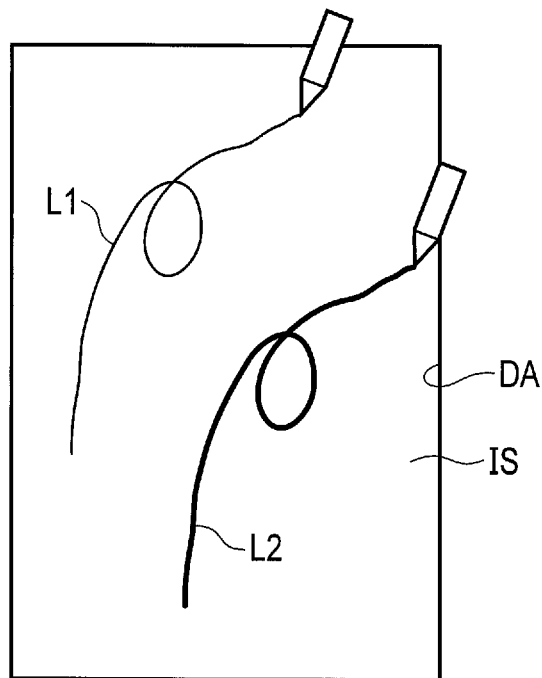
F I G. 27
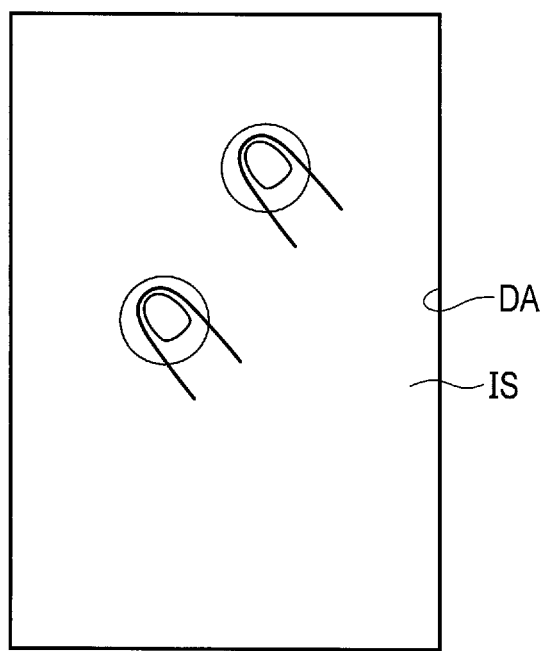
F I G. 28

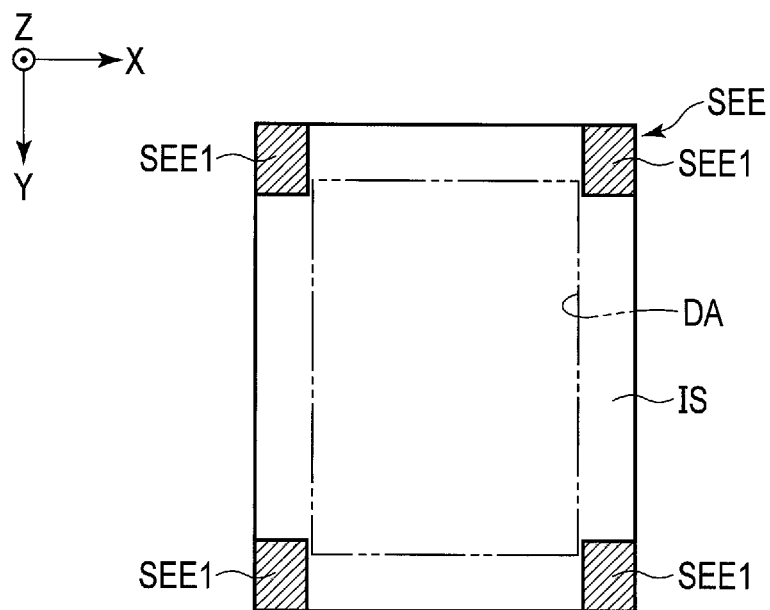
F I G. 29
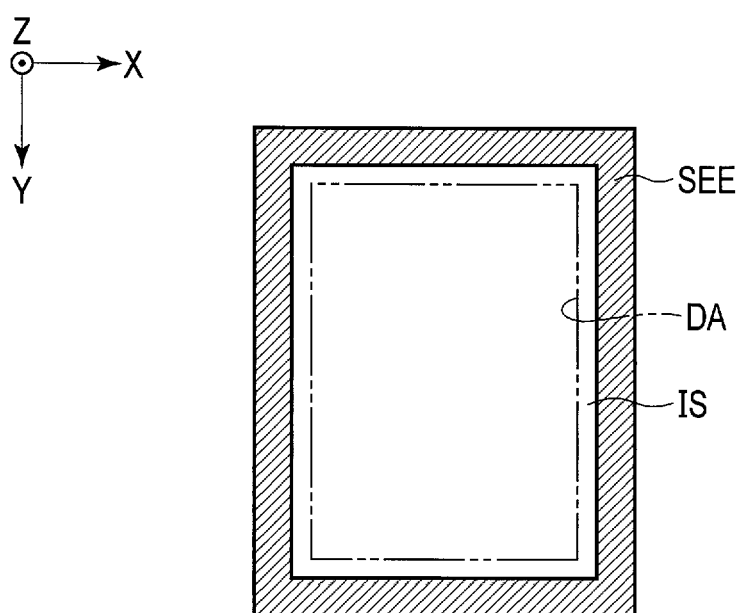
F I G. 30

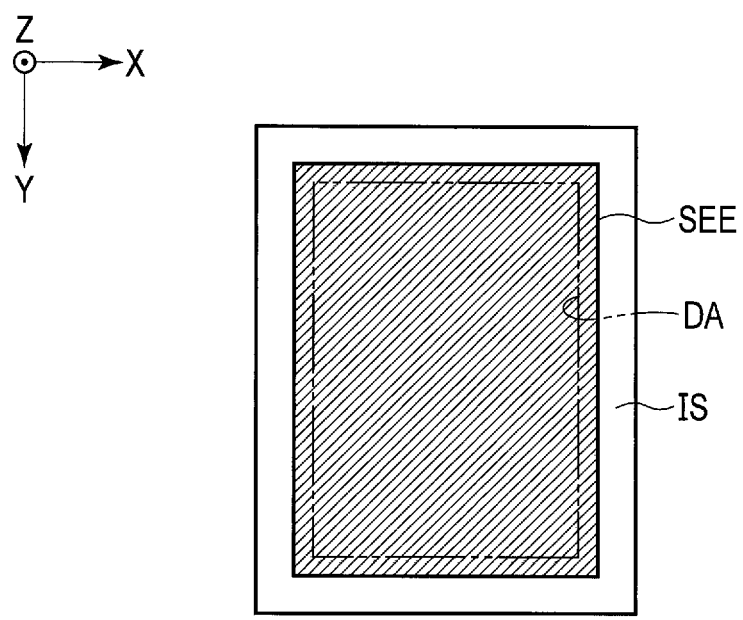
F I G. 31

SENSOR-EQUIPPED DISPLAY DEVICE

CROSS-REFERENCE TO RELATED APPLICATIONS

The present application is a continuation application of U.S. patent application Ser. No. 15/162,771, filed May 24, 2016, which is based upon and claims the benefit of priority from Japanese Patent Application No. 2015-110731, filed May 29, 2015, the entire contents of which are incorporated herein by reference.

FIELD

Embodiments described herein relate generally to a sensor-equipped display device.

BACKGROUND

Recently, a sensor-equipped display device comprising a sensor (also called a touchpanel) which detects a touch or approach of an object is used. A capacitive sensor which detects a touch or approach of a conductor such as a finger based on variations in capacitance is an example of the sensor. Detection electrodes and sensor drive electrodes constituting such a sensor are provided in a display area in which an image is displayed and are opposed to each other through a dielectric.

SUMMARY

The present application generally relates to a sensor-equipped display device.

In an embodiment, a sensor-equipped display device includes a display panel is provided. The sensor-quipped display device includes a common electrode; a detection electrode; a conductive member arranged at intervals from the display panel and the detection electrode; and a controller, wherein in a display period during which an image is displayed, the controller drives the common electrode, in a first sense period which is different from the display period, the controller drives the common electrode or the detection electrode and extracts input position data from the detection electrode, and in a second sense period which is different from the display period and the first sense period, the controller drives the conductive member and extracts, from a first electrode which is any one of the common electrode and the detection electrode, first input pressure data based on a variation in a first distance between the conductive member and the first electrode, or the controller drives a second electrode which is any one of the common electrode and the detection electrode and extracts, from the conductive member, second input pressure data based on a variation in a second distance between the second electrode and the conductive member, or the controller drives a third electrode which is any one of the common electrode and the detection electrode and extracts, from the third electrode, third input pressure data based on a variation in a third distance between the third electrode and the conductive member.

In an embodiment, a sensor-equipped display device is provided. The sensor-quipped display device includes a display panel comprising a common electrode; a detection electrode; a sensor electrode; a conductive member arranged at intervals from the display panel, the detection electrode and the sensor electrode; and a controller, wherein in a display period during which an image is displayed, the controller drives the common electrode, in a first sense period which is different from the display period, the controller drives the common electrode or the detection electrode and extracts input position data from the detection electrode, and in a second sense period which is different from the display period and the first sense period, the controller drives the conductive member and extracts, from the sensor electrode, first input pressure data based on a variation in a distance between the conductive member and the sensor electrode, or the controller drives the sensor electrode and extracts, from the conductive member, second input pressure data based on the variation in the distance, or the controller drives the sensor electrode and extracts, from the sensor electrode, third input pressure data based on the variation in the distance.

BRIEF DESCRIPTION OF THE DRAWINGS

FIG. 2 is an exploded perspective view showing a backlight unit shown in FIG. 1.

FIG. 5 is a diagram showing a basic structure and an equivalent circuit of the liquid crystal display device shown in FIG. 1.

FIG. 7 is a plan view showing a first substrate of the liquid crystal display device and showing a first insulating substrate, a plurality of divisional electrodes of a common electrode, a plurality of lead lines and a common electrode drive circuit.

FIG. 8 is a plan view showing a part of the liquid crystal display device and showing the first insulating substrate, a second insulating substrate, a peripheral light-shielding layer and a detection unit.

FIG. 9 is a table showing operation, mode and method of the liquid crystal display device in each period.

FIG. 11 is an illustration showing a principle of an example of first sensing in a second mode.

FIG. 12 is an enlarged plan view showing a part of a third area outside a display area of the first substrate of the liquid crystal display panel including a circuit diagram showing a multiplexer.

FIG. 13 is a table showing a target of drive and a target of extraction of pressure data in the case where second sensing in the second mode is executed in a first method.

FIG. 14 is a table showing a target of drive and a target of extraction of pressure data in the case where second sensing in the second mode is executed in a second method.

FIG. 15 is a table showing a target of drive, a target of extraction of pressure data and a target of ground potential in the case where second sensing in the first mode is executed.

FIG. 16 is a cross-sectional view showing a structure of a sensor-equipped liquid crystal display device of example 1 of the embodiment.

FIG. 24 is a plan view showing a sensor electrode and a casing shown in FIG. 23.

FIG. 27 is an illustration showing an example of use of an application by the liquid crystal display device of the embodiment.

FIG. 28 is an illustration showing an example of use of another application by the liquid crystal display device of the embodiment.

FIG. 29 is a plan view showing modified example 1 of the sensor electrode of the embodiment.

FIG. 30 is a plan view showing modified example 2 of the sensor electrode of the embodiment.

FIG. 31 is a plan view showing modified example 3 of the sensor electrode of the embodiment.

DETAILED DESCRIPTION

Figure 1:
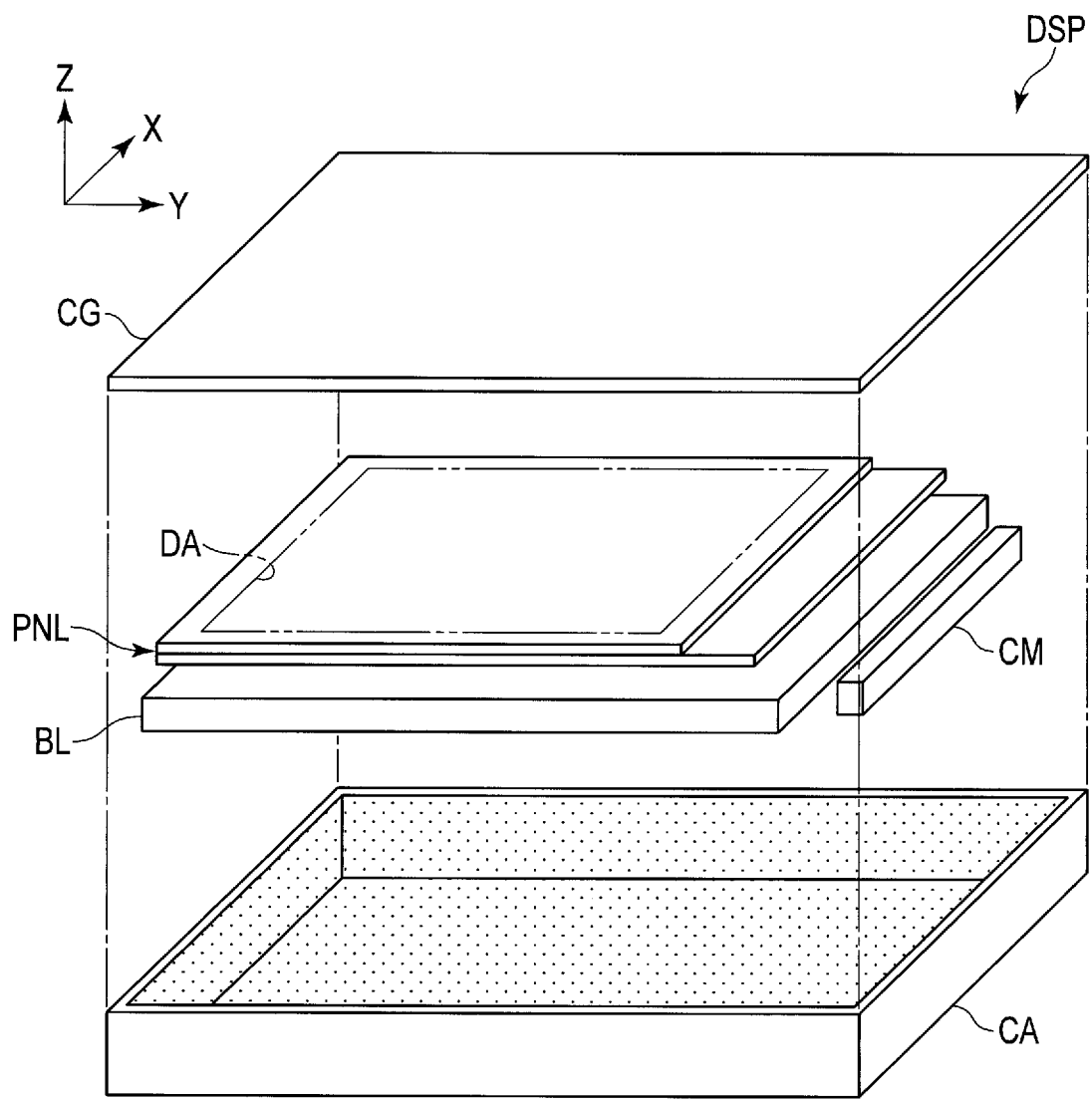
FIG. 1 is an exploded perspective view showing a structure of a liquid crystal display device of an embodiment.

In general, according to one embodiment, there is provided a sensor-equipped display device comprising: a display panel comprising a common electrode; a detection electrode; a conductive member arranged at intervals from the display panel and the detection electrode; and a controller, wherein in a display period during which an image is displayed, the controller drives the common electrode, in a first sense period which is different from the display period, the controller drives the common electrode or the detection electrode and extracts input position data from the detection electrode, and in a second sense period which is different from the display period and the first sense period, the controller drives the conductive member and extracts, from a first electrode which is any one of the common electrode and the detection electrode, first input pressure data based on a variation in a first distance between the conductive member and the first electrode, or the controller drives a second electrode which is any one of the common electrode and the detection electrode and extracts, from the conductive member, second input pressure data based on a variation in a second distance between the second electrode and the conductive member, or the controller drives a third electrode which is any one of the common electrode and the detection electrode and extracts, from the third electrode, third input pressure data based on a variation in a third distance between the third electrode and the conductive member.

According to another embodiment, there is provided a sensor-equipped display device comprising: a display panel comprising a common electrode; a detection electrode; a sensor electrode; a conductive member arranged at intervals from the display panel, the detection electrode and the sensor electrode; and a controller, wherein in a display period during which an image is displayed, the controller drives the common electrode, in a first sense period which is different from the display period, the controller drives the common electrode or the detection electrode and extracts input position data from the detection electrode, and in a second sense period which is different from the display period and the first sense period, the controller drives the conductive member and extracts, from the sensor electrode, first input pressure data based on a variation in a distance between the conductive member and the sensor electrode, or the controller drives the sensor electrode and extracts, from the conductive member, second input pressure data based on the variation in the distance, or the controller drives the sensor electrode and extracts, from the sensor electrode, third input pressure data based on the variation in the distance.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

A sensor-equipped display device of an embodiment is described in detail. In the present embodiment, an example in which the display device is a liquid crystal display device is described. FIG. 1 is an exploded perspective view showing a structure of the liquid crystal display device of the embodiment.

As shown in FIG. 1, a liquid crystal display device DSP comprises a liquid crystal display panel PNL, a backlight unit BL which illuminates the liquid crystal display panel PNL, a control module CM which electrically controls the liquid crystal display panel PNL and the backlight unit BL, a casing CA and a cover member CG. The liquid crystal display panel PNL has a plane parallel to an X-Y plane defined by a first direction X and a second direction Y which are perpendicular to each other. The first direction X and the second direction Y are perpendicular to each other in the present embodiment, but may cross each other at an angle other than 90°. A third direction Z is perpendicular to each of the first direction X and the second direction Y. The third direction Z corresponds to a thickness direction of the liquid crystal display panel PNL.

In the third direction Z, the liquid crystal display panel PNL and the backlight unit BL are located between a bottom surface of the casing CA and the cover member CG, and the backlight unit BL is located between the casing CA and the liquid crystal display panel PNL. The backlight unit BL can be arranged at an interval from the liquid crystal display panel PNL. The backlight unit BL can also be arranged at an interval from the casing CA. The casing CA has the shape of an open-topped box and accommodates the liquid crystal display panel PNL, the backlight unit BL and the control module CM. The casing CA may be formed of a conductive material such as metal or formed of resin coated with a surface layer of a metal material. The cover member CG closes the opening of the casing CA and covers the liquid crystal display panel PNL, etc., together with the casing CA.

FIG. 2 is an exploded perspective view showing the backlight unit BL shown in FIG. 1. As shown in FIG. 2, the backlight unit BL comprises a light guide LG, a light source LS, a light reflector RS, a light diffusion sheet DI, a brightness enhancement film BEF and a frame FR. The backlight unit BL has a shape and a size corresponding to the liquid crystal display panel PNL.

The light guide LG is located between the liquid crystal display panel PNL and the casing CA. In the present embodiment, the light guide LG is formed into a flat rectangle. The light source LS emits light toward the light guide LG. In the present embodiment, the light source LS uses a light-emitting diode (LED) and faces one side surface of the light guide LG.

The light reflector RS is located between the light guide LG and the casing CA. The light reflector RS reflects light, which is output from the light guide LG to the opposite side of the liquid crystal display panel PNL, to the liquid crystal display panel PNL side. A brightness level of a display image can be improved by reducing light loss. In the present embodiment, the light reflector RS is formed into a rectangular sheet. In the X-Y plane, the area of the light reflector RS is substantially the same as the area of the light guide LG. For example, the light reflector RS may have a multi-layer film structure using polyester resin.

The light diffusion sheet DI is located between the light guide LG and the liquid crystal display panel PNL. The light diffusion sheet DI can diffuse light incident from the light guide LG side toward the liquid crystal display panel PNL. That is, since light that has passed through the light diffusion sheet DI is diffused, the light diffusion sheet DI can reduce non-uniformity in brightness of the light incident from the backlight unit BL in the X-Y plane. In the present embodiment, the light diffusion sheet DI is formed into a rectangular sheet. In the X-Y plane, the area of the light diffusion sheet DI is substantially the same as the area of the light guide LG.

The brightness enhancement film BEF is located between the light diffusion sheet DI and the liquid crystal display panel PNL. The brightness enhancement film BEF has a function of enhancing the brightness level of the light incident from the backlight unit BL. In the present embodiment, the brightness enhancement film BEF is formed into a rectangular film. In the X-Y plane, the area of the brightness enhancement film BEF is substantially the same as the area of the light guide LG.

The frame FR is used to modularize the backlight unit BL. The light guide LG, the light source LS, etc., are attached to the frame FR and relative positions of the light guide LG and the light source LS are fixed. In the present embodiment, the frame FR is formed into a rectangular frame. In the X-Y plane, the frame FR entirely surrounds the aggregate of the light guide LG and the light source LS. In the present embodiment, a path FRP through which a flexible printed circuit to be connected to the light source LS passes is formed in the frame FR. The frame FR can be formed of a conductive material such as metal.

The shape of the frame FR in the X-Y plane can be variously changed as long as it does not interfere with the illumination of the liquid crystal display panel PNL. For example, in the X-Y plane, the frame FR may have an L shape facing two adjacent sides of the light guide LG, a H shape facing three adjacent sides of the light guide LG, a II shape facing two opposing sides of the light guide LG or the like.

The backlight unit BL shown in FIG. 2 is just an example and the backlight unit BL can take various forms. For example, the backlight unit BL can be formed without at least a part of the light reflector RS, the light diffusion sheet DI and the brightness enhancement film BEF. Alternatively, an optical member not shown in FIG. 2 can be added to the backlight unit BL. The backlight unit BL can take various forms as long as it is configured to emit light toward the liquid crystal display panel PNL. In the case where the liquid crystal display panel PNL is a reflective display panel having only a reflective display function, the backlight unit BL is omitted.

Figure 3:
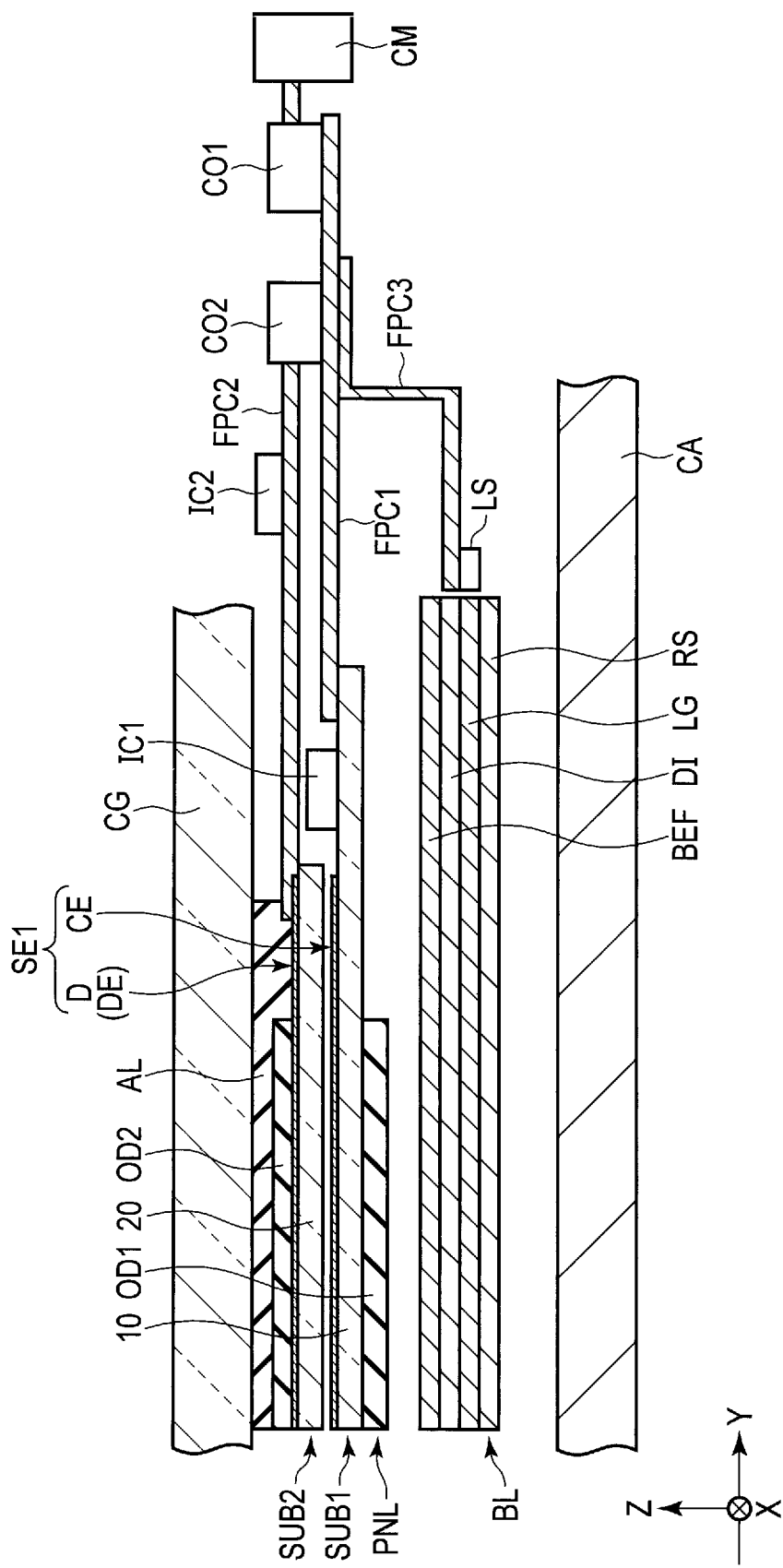
FIG. 3 is a cross-sectional view showing the structure of the liquid crystal display device shown in FIG. 1.

FIG. 3 is a cross-sectional view showing the structure of the liquid crystal display device DSP shown in FIG. 1.

As shown in FIG. 3, the liquid crystal display device DSP comprises the liquid crystal display panel PNL, a drive IC chip IC1 which drives the liquid crystal display panel PNL, the cover member CG, a first optical element OD1, a second optical element OD2, a detection unit D, a drive IC chip IC2 which drives the liquid crystal display panel PNL and the detection unit D, the backlight unit BL and flexible printed circuits FPC1, FPC2 and FPC3.

The drive IC chip IC1 is mounted on a first substrate SUB1 of the liquid crystal display panel PNL. The flexible printed circuit FPC1 is connected to the liquid crystal display panel PNL. Connectors CO1 and CO2 are mounted on the flexible printed circuit FPC1. The flexible printed circuit FPC1 is connected to the control module CM via the connector CO1.

The flexible printed circuit FPC2 connects the detection unit D to the connector CO2. The flexible printed circuit FPC3 connects the light source LS (backlight unit BL) to the flexible printed circuit FPC1. The drive IC chips IC1 and IC2 are connected to each other via the flexible printed circuits FPC1 and FPC2, etc. For example, the drive IC chip IC2 may be mounted on any one of the flexible printed circuits FPC1, FPC2 and FPC3 or may be divided and mounted on both the flexible printed circuits FPC1 and FPC2.

The means for connecting the control module CM, the liquid crystal display panel PNL and the detection unit D to each other and the means for connecting the light source LS to the control module CM may be variously changed. For example, a single flexible printed circuit can be used instead of the independent three flexible printed circuits FPC1, FPC2 and FPC3 and the connectors CO1 and CO2. In this case, the flexible printed circuit can be connected to the control module CM, a first branch portion of the flexible printed circuit can be connected to the liquid crystal display panel PNL, a second branch portion of the flexible printed circuit can be connected to the detection unit D and a third branch portion of the flexible printed circuit can be connected to the light source LS.

The control module CM and the drive IC chips IC1 and IC2 function as a controller of a first sensor SE1 comprising a common electrode CE and the detection unit D of the liquid crystal display panel PNL. The controller serves as a drive unit that drives the common electrode CE and a detection unit that extracts a signal from the detection unit D. The control module CM can be restated as an application processor. The drive IC chip IC2 can supply a timing signal to report a drive period of the first sensor SE1 to the drive IC chip IC1. Otherwise, the drive IC chip IC1 can supply a timing signal to report a drive period of the common electrode CE to the drive IC chip IC2. Otherwise, the control module CM can supply a timing signal to each of the drive IC chips IC1 and IC2. A drive of the drive IC chip IC1 can be synchronized with a drive of the drive IC chip IC2 by the timing signal.

The control module CM is connected to the light source LS and controls a drive of the light source LS.

Figure 4:
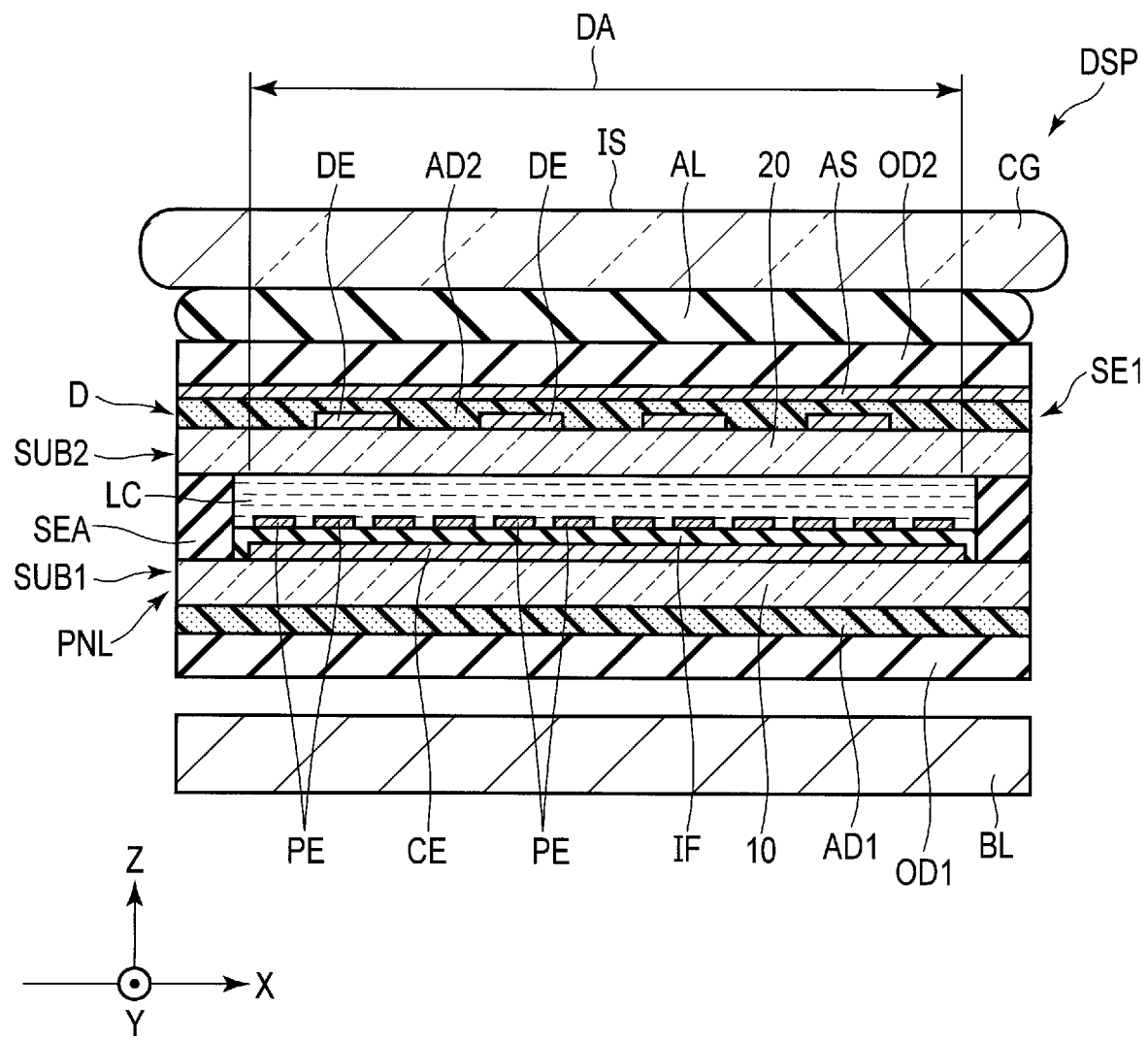
FIG. 4 is a cross-sectional view showing the structure of the liquid crystal display device shown in FIG. 1 and showing a liquid crystal display panel, a cover member, etc.

FIG. 4 is a cross-sectional view showing the structure of the liquid crystal display device DSP shown in FIG. 1 and showing the liquid crystal display panel PNL, the cover member CG, etc.

As shown in FIG. 4, the liquid crystal display device DSP comprises the liquid crystal display panel PNL, the cover member CG, the first optical element OD1, the second optical element OD2, the backlight unit BL, etc.

The liquid crystal display panel PNL comprises a first flat substrate SUB1, a second flat substrate SUB2 opposed to the first substrate SUB1 and a liquid crystal layer LC held between the first substrate SUB1 and the second substrate SUB2. The liquid crystal display panel PNL has a display area (active area) DA in which an image is displayed. The first substrate SUB1 and the second substrate SUB2 are bonded to each other by a sealing member SEA outside the display area DA. For example, the first substrate SUB1 is formed by using a first insulating substrate 10 having a light transmitting property such as a glass substrate or a resin substrate. The first substrate SUB1 comprises a common electrode CE, a plurality of pixel electrodes PE, an insulating film IF formed between the common electrode CE and the pixel electrodes PE on a side of the first insulating substrate 10 opposed to the second substrate SUB2. The common electrode CE and the pixel electrodes PE are formed of a transparent conductive material such as indium tin oxide (ITO), indium zinc oxide (IZO) or zinc oxide (ZnO). The second substrate SUB2 is formed by using a second insulating substrate 20 having a light transmitting property such as a glass substrate or a resin substrate.

The illustrated liquid crystal display panel PNL has a structure conforming to a fringe field switching (FFS) mode as a display mode, but may have a structure conforming to other display modes. For example, the liquid crystal display panel PNL may have a structure conforming to an in-plane switching (IPS) mode mainly using a lateral electric field substantially parallel to a main substrate surface such as the FFS mode. In the display mode using the lateral electric field, for example, a structure in which both the common electrode CE and the pixel electrodes PE are provided on the first substrate SUB1 can be applied. Alternatively, the liquid crystal display panel PNL may have a structure conforming to a mode mainly using a longitudinal electric field occurring between main substrate surfaces such as a twisted nematic (TN) mode, an optically compensated bend (OCB) mode, a vertical aligned (VA) mode, etc. In the display mode using the longitudinal electric field, for example, a structure in which the pixel electrodes PE are provided on the first substrate SUB1 and the common electrode CE is provided on the second substrate SUB2 can be applied. It should be noted that the main substrate surface is a surface parallel to the X-Y plane.

In the present embodiment, the first substrate SUB1 can be restated as an array substrate, and the second substrate SUB2 can be restated as a counter-substrate. The liquid crystal display panel PNL is a transmissive liquid crystal display panel having a transmissive display function of displaying an image by selectively transmitting light from the backlight unit BL. The liquid crystal display panel PNL may be a transflective liquid crystal display panel having a reflective display function of displaying an image by selectively reflecting outside light in addition to the transmissive display function.

The cover member CG is located on the outer side of the liquid crystal display panel PNL and opposed to the second substrate SUB2. In this example, an input surface IS of the liquid crystal display device DSP is a surface of the cover member CG. The liquid crystal display device DSP can detect position data (input position data) of a first input means when the first input means touches or approaches the input surface IS. The liquid crystal display device DSP can also detect pressure data (input pressure data) when the input surface IS is pressed by a second input means. The pressure data is data about a pressure applied to the input surface IS by the second input means. Obtainable data varies according to the intensity of the pressure. A conductor or a conductive object such as a finger can be used as the first input means. The second input means may be any object as long as it can apply a load to the input surface IS. For example, a dielectric and an insulator can be used in addition to the conductor and the finger.

For example, the finger can serve as both the first input means and the second input means. That is, the liquid crystal display device DSP can detect both position data and pressure data of a position pressed with the finger.

In an X-Y plane view, for example, the cover member CG is greater in size than the second substrate SUB2 and the first substrate SUB1. The cover member CG is formed of, for example, a glass substrate. In this case, the cover member CG may be called a cover glass. Alternatively, the cover member CG may be formed of a substrate having a light transmitting property such as a resin substrate.

The first optical element OD1 is provided between the first insulating substrate 10 and the backlight unit BL. The first optical element OD1 is bonded to the first insulating substrate 10 by adhesive AD1. The second optical element OD2 is located between the liquid crystal display panel PNL and the cover member CG. The second optical element OD2 is bonded to the second insulating substrate 20 and the detection unit D by adhesive AD2. Each of the first optical element OD1 and the second optical element OD2 includes at least a polarizer and may include a retardation film as needed. An absorption axis of the polarizer included in the first optical element OD1 crosses an absorption axis of the polarizer included in the second optical element OD2. For example, these absorption axes of the polarizers are orthogonal to each other.

In order to prevent the second optical element OD2 from being electrically charged, an antistatic layer AS is provided between the second optical element OD2 and the adhesive AD2. However, the antistatic layer AS may be located between the second optical element OD2 and the cover member CG. The antistatic layer AS may be provided in the liquid crystal display device DSP as appropriate.

The cover member CG is bonded to the second optical element OD2 by an adhesive layer AL. For example, the adhesive layer AL is formed of optically clear resin (OCR). The adhesive layer AL may be elastically deformed because the liquid crystal display device DSP detects pressure data as described above, but the adhesive layer AL will do as long as it can transmit a pressure from the cover member CG to the second optical element OD2.

The detection unit D is located between the common electrode CE and the cover member CG. In the present embodiment, the detection unit D is provided above a surface of the second insulating substrate 20 opposed to the second optical element OD2. The detection unit D may be in contact with or remote from the second insulating substrate 20. In the latter case, a member such as an insulating film (not shown) is provided between the second insulating substrate 20 and the detection unit D. The detection unit D comprises a plurality of detection electrodes DE extending in the second direction Y, etc. The detection unit D also has a function of causing a charge stored in the antistatic layer AS to escape to the outside.

The common electrode CE and the detection unit D form a first capacitive sensor SE1. The common electrode CE functions as an electrode for display and also functions as a sensor drive electrode. The first sensor SE1 is used to detect position data.

FIG. 5 is a diagram showing a basic structure and an equivalent circuit of the liquid crystal display device DSP shown in FIG. 1.

As shown in FIG. 5, the liquid crystal display panel PNL is an active-matrix liquid crystal display panel. The liquid crystal display panel PNL comprises a gate line drive circuit GD located in a non-display area NDA outside the display area DA. The drive IC chip IC1 which drives the liquid crystal display panel PNL is located in the non-display area NDA of the liquid crystal display panel PNL. In the present embodiment, the drive IC chip IC1 comprises a source line drive circuit SD and a common electrode drive circuit CD. The drive IC chip IC1 may comprise at least a part of the source line drive circuit SD and the common electrode drive circuit CD. The non-display area NDA has a rectangular frame shape surrounding the display area DA. The display area may have a shape other than a rectangle such as a circle, an ellipse or a partially-bent rectangle in a plan view.

The liquid crystal display panel PNL comprises a plurality of pixels PX in the display area DA. A matrix of m×n pixels PX is arranged in the first direction X and the second direction Y (m and n are positive integers). The liquid crystal display panel PNL also comprises n gate lines G (G1 to Gn), m source lines S (S1 to Sm), the common electrode CE, etc., in the display area DA. In the present embodiment, three consecutive pixels PX in the first direction X are red, green and blue pixels which constitute a main pixel.

The gate lines G extend substantially linearly in the first direction X, are led out to the outside of the display area DA, and are connected to the gate line drive circuit GD. The gate lines G are spaced out in the second direction Y. The source lines S extend substantially linearly in the second direction Y, are led out to the outside of the display area DA, and are connected to the source line drive circuit SD. The source lines S are spaced out in the first direction X and cross the gate lines G. The gate lines G and the source lines S do not necessarily extend linearly, and may be partly bent. The common electrode CE is provided at least in the display area DA and electrically connected to the common electrode drive circuit CD. The common electrode CE comprises a plurality of divisional electrodes C. Each divisional electrode C is shared by several of the pixels PX.

Figure 6:
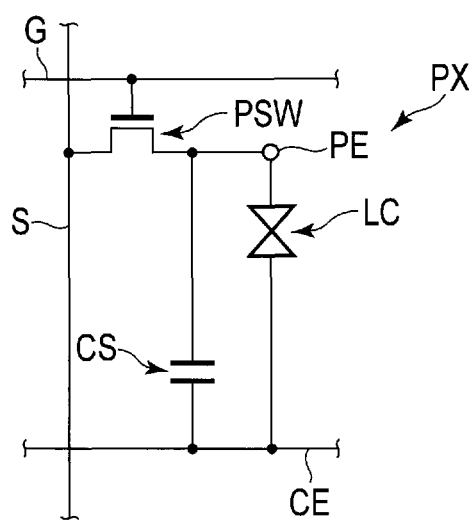
FIG. 6 is an equivalent circuit diagram showing one of pixels shown in FIG. 4.

FIG. 6 is an equivalent circuit diagram showing one of the pixels PX shown in FIG. 5.

As shown in FIG. 6, each pixel PX comprises a pixel switching element PSW, a pixel electrode PE, a common electrode CE (divisional electrode C), a liquid crystal layer LC, etc. The pixel switching element PSW is realized by, for example, a thin-film transistor. The pixel switching element PSW is electrically connected to the gate line G and the source line S. The pixel switching element PSW may be either a top or bottom gate TFT. A semiconductor layer of the pixel switching element PSW is formed of, for example, polycrystalline silicon, but may be formed of amorphous silicon or an oxide semiconductor. The pixel electrode PE is formed of a transparent conductive film of ITO, etc., and electrically connected to the pixel switching element PSW. The pixel electrode PE is opposed to the common electrode CE. The common electrode CE, the insulating film (insulating film IF) and the pixel electrode PE form a storage capacitor CS.

FIG. 7 is a plan view showing the first substrate SUB1 of the liquid crystal display device DSP and showing the first insulating substrate 10, the divisional electrodes C of the common electrode CE, a plurality of lead lines LCE and the common electrode drive circuit CD.

As shown in FIG. 7, the divisional electrodes C are strip-shaped, extend in the first direction X and are spaced out in the second direction Y. The common electrode CE is formed in the display area DA in the present embodiment, but is not limited to this and a part of the common electrode CE may extend to the non-display area NDA.

The lead lines LCE are located in the non-display area NDA and electrically connect the common electrode CE to the common electrode drive circuit CD. In the example illustrated, the lead lines LCE are electrically connected to the divisional electrodes C, respectively. The lead lines LCE may be formed of a transparent conductive material such as ITO, IZO or ZnO in the same manner as the divisional electrodes C but may be formed of metal instead of the transparent conductive material.

The number, size and shape of the divisional electrodes C are not particularly limited and can be variously changed. The common electrode CE is not necessarily divided and may be a single planar electrode continuously formed in the display area DA. The divisional electrodes C extend in the first direction X in the present embodiment, but are not limited to this and may extend in the second direction Y. In this case, the detection electrodes DE may extend in the first direction X.

It is assumed that, of the non-display area NDA, the left side of the display area DA is a first area A1 (strip-shaped area extending in the second direction Y), the right side of the display area DA is a second area A2 (strip-shaped area extending in the second direction Y), the lower side of the display area DA is a third area A3 (strip-shaped area extending in the first direction X), and the upper side of the display area DA is a fourth area A4 (strip-shaped area extending in the first direction X). For example, the common electrode drive circuit CD is arranged in the third area A3 and the lead lines LCE extend in the first area A1 and the third area A3.

FIG. 8 is a plan view showing a part of the liquid crystal display device DSP and showing the first insulating substrate 10, the second insulating substrate 20, a peripheral light-shielding layer LSL and the detection unit D. FIG. 8 is a plan view showing the detection unit D, etc., in the opposite direction of the third direction Z.

As shown in FIG. 8, the peripheral light-shielding layer LSL is arranged in the non-display area NDA of the second substrate SUB2. The peripheral light-shielding layer LSL extends over almost the entire non-display area NDA of the second substrate SUB2. For example, the peripheral light-shielding layer LSL is provided on a side of the second insulating substrate 20 opposed to the first substrate SUB1.

The detection unit D comprises the detection electrodes DE, a plurality of dummy units DU and a plurality of lead lines LDE. The detection electrodes DE are strip-shaped, extend in the second direction Y and are spaced out in the first direction X.

The lead lines LDE are located in the non-display area NDA and electrically connect the detection electrodes DE to the flexible printed circuit FPC2. In the example illustrated, the lead lines LDE are electrically connected to the detection electrodes DE, respectively, and extend in the third area A3.

Each dummy unit DU is provided between adjacent detection electrodes DE. The dummy units DU should preferably be formed over at least the entire display area DA excluding the detection electrodes DE. The dummy units DU are not connected to lines such as the lead lines LDE and are in an electrically floating state. Each dummy unit DU comprises a plurality of dummy electrodes DR provided at intervals. The dummy electrodes DR are also arranged at an interval from the detection electrodes DE.

The detection electrodes DE and the dummy units DU are formed of a transparent conductive material such as ITO, IZO or ZnO. The lead lines LDE may be formed of a transparent conductive material such as ITO, IZO or ZnO in the same manner as the detection electrodes DE, etc., but may be formed of fine metal lines ranging from several micrometers to several tens of micrometers in thickness instead of the transparent conductive material.

Since the intervals are provided between the dummy electrodes DE as described above, a signal can be transmitted from the common electrode CE to the detection electrodes DE through the intervals. For example, the common electrode CE can be capacitively coupled with the detection electrodes DE.

Next, operation executed at the time of a display drive for displaying an image in the FFS mode liquid crystal display device DSP is described.

First, an off-state in which no voltage is applied to the liquid crystal layer LC is described. The off-state corresponds to a state in which a potential difference is not applied between the pixel electrodes PE and the common electrode CE. In such an off-state, liquid crystal molecules included in the liquid crystal layer LC are subjected to initial alignment unidirectionally in the X-Y plane by an alignment restriction force of each of the first substrate SUB1 and the second substrate SUB2. Part of light from the backlight unit BL passes through the polarizer of the first optical element OD1 and is made incident on the liquid crystal display panel PNL. The light incident on the liquid crystal display panel PNL is linearly polarized light orthogonal to the absorption axis of the polarizer. Such a polarized state of the linearly polarized light hardly varies when the light passes through the liquid crystal display panel PNL in the off-state. For this reason, most part of the linearly polarized light which has passed through the liquid crystal display panel PNL is absorbed by the polarizer of the second optical element OD2 (black display). A mode in which the liquid crystal display panel PNL becomes a black display in the off-state is called a normally-black mode.

Next, an on-state in which a voltage is applied to the liquid crystal layer LC is described. The on-state corresponds to a state in which a potential difference is applied between the pixel electrodes PE and the common electrode CE. That is, a common drive signal (common voltage) is supplied from the common electrode drive circuit CD to the common electrode CE. A video signal (image signal) to produce a potential difference relative to the common voltage is supplied to the pixel electrodes PE. A fringe field is thereby produced between the pixel electrodes PE and the common electrode CE in the on-state.

In such an on-state, the liquid crystal molecules are aligned in a direction different from the initial alignment direction in the X-Y plane. In the on-state, linearly polarized light orthogonal to the absorption axis of the polarizer of the first optical element OD1 is made incident on the liquid crystal display panel PNL, and the polarized state of the light varies according to the alignment state of the liquid crystal molecules when the light passes through the liquid crystal layer LC. For this reason, at least part of the light which has passed through the liquid crystal layer LC passes through the polarizer of the second optical element OD2 in the on-state (white display).

Next, operation of the liquid crystal display device DSP is described. FIG. 9 is a table showing operation, mode and method of the liquid crystal display device DSP in each period.

As shown in FIG. 9, the operation of the liquid crystal display device DSP can be classified into a display drive in a display period and a sense drive in a sense period (touch detection period). The sense drive can be classified into a first sense drive and a second sense drive.

At the time of the first sense drive, first sensing for detecting a touch or approach of a finger (first input means) to the input surface IS of the liquid crystal display device DSP is executed. The first sensor SE1 is used to execute the first sensing. Input position data of the finger can be detected by the first sensing. The first sensing is also called position detection. The controller constituted by the drive IC chips IC1 and IC2 and the control module CM of the liquid crystal display device DSP controls the first sensor SE1 in either the first mode or the second mode and executes the first sensing. The first mode may be restated as a self-capacitive sensing mode and the second mode may be restated as a mutual-capacitive sensing mode.

At the time of the second sense drive, second sensing for detecting pressure data (intensity and distribution of a pressure) when the input surface IS of the liquid crystal display device DSP is pressed with the finger (second input means) is executed. A second sensor (SE2) to be described later is used to execute the second sensing. Input pressure data of the finger can be detected by the second sensing. The second sensing is also called pressure detection. The controller constituted by the drive IC chips IC1 and IC2 and the control module CM of the liquid crystal display device DSP controls the second sensor in either the first mode or the second mode and executes the second sensing. In the second sensing, too, the first mode may be restated as a self-capacitive sensing mode and the second mode may be restated as a mutual-capacitive sensing mode. The second sensing in the second mode can be further roughly classified into a first method and a second method.

Next, the first sensing is described.

<Position Detection in First Mode (Self-Capacitive Sensing Mode)>

First, the first sensing in the first mode is described. The feature of the first mode is that the entire input area becomes a target of sensing and position data of the finger can be roughly detected at short times. In the first sensing in the first mode, target Tx1 of drive and target Rx1 of extraction of position data are as follows:

Tx1: detection electrodes DE
Rx1: detection electrodes DE

Figure 10A:
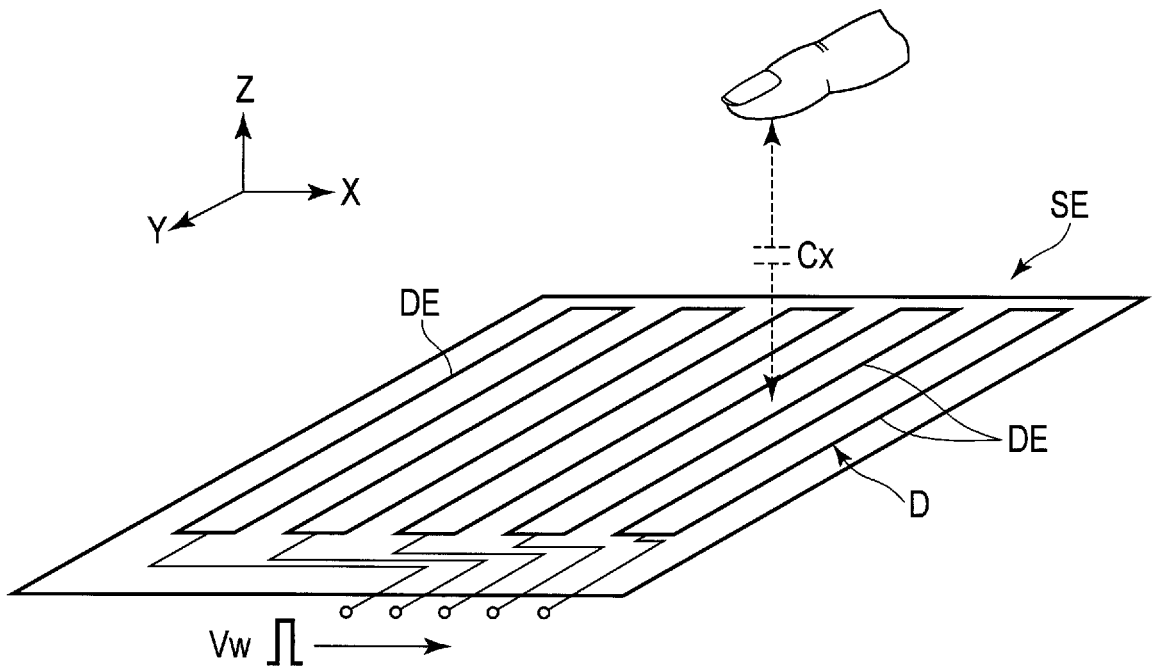
FIG. 10A is an illustration showing a principle of an example of first sensing in a first mode.
Figure 10B:
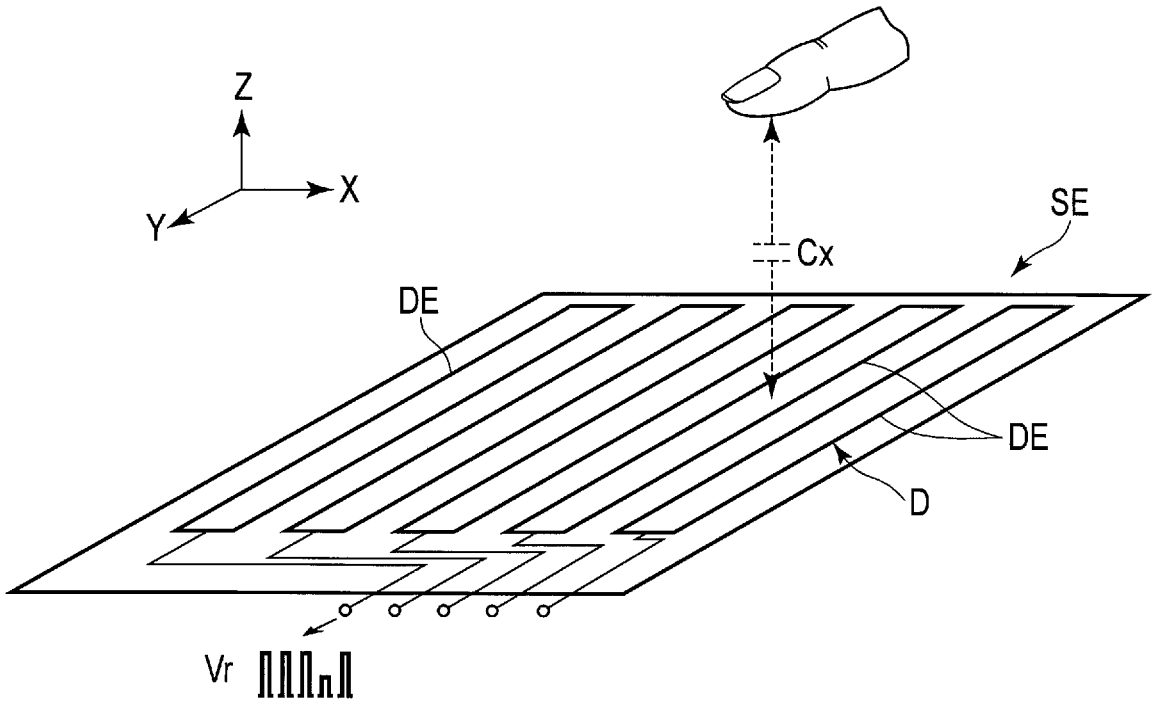
FIG. 10B is an illustration following on from FIG. 10A showing the principle of the example of the first sensing in the first mode.

As shown in FIG. 10A, the drive IC chip IC2 first writes a write signal Vw to each detection electrode DE and drives the detection electrodes DE. Then, as shown in FIG. 10B, the drive IC chip IC2 reads read signals Vr from the detection electrodes DE. The read signals Vr indicate variations in a sensor signal produced in the detection electrodes DE by the write signal Vw. The drive IC chip IC2 can extract position data of the finger by reading the read signals Vr.

In the example of FIG. 10A and FIG. 10B, the user's finger approaches the second detection electrode DE from the right and this detection electrode is capacitively coupled with the finger. A voltage value of a read signal Vr read from the second detection electrode DE from the right changes more than those of read signals Vr read from the other detection electrodes DE.

Therefore, an area opposed to the second detection electrode DE from the right can be determined as an x-coordinate of an input position. That is, it is possible to detect that the finger touches or approaches the input surface IS of the liquid crystal display device DSP in the area opposed to the detection electrode DE.

<Position Detection in Second Mode (Mutual-Capacitive Sensing Mode)>

Next, the first sensing in the second mode is described. The feature of the second mode is that at least a part of the input area becomes a target of sensing and x- and y-coordinates of the input position can be detected in detail. In the first sensing in the second mode, target Tx1 of drive and target Rx1 of extraction of position data are as follows:

Tx1: common electrode CE
Rx1: detection electrodes DE

As shown in FIG. 11, capacitance Cc is present between the common electrode CE and the detection electrodes DE. That is, the detection electrodes DE are capacitively coupled with the common electrode CE. In this example, it is assumed that the user's finger is close to a position where the second divisional electrode C from the top crosses the second detection electrode DE from the right. Coupling capacitance Cx is produced by approach of the user's finger to the detection electrode DE.

First, the drive IC chip IC1 writes a pulse write signal (sensor drive signal) Vw to the divisional electrodes C and produces a sensor signal between the divisional electrodes C and the detection electrodes DE. Next, the drive IC chip IC2 reads read signals Vr indicating variations in the sensor signal (for example, capacitance occurring in the detection electrodes DE) from the detection electrodes DE. The drive IC chip IC2 can extract position data of the finger by reading the read signals Vr. The position data of the finger can be detected based on timing of supplying the write signal Vw to the divisional electrodes C and the read signals Vr from the detection electrodes DE.

The first sensing in the second mode can be executed after the position data of the finger is roughly detected by the first sensing in the first mode. In the above example, since an input to the area opposed to the second detection electrode DE from the right has been specified by the first sensing in the first mode, only this area or the vicinity of this area may be a target and x- and y-coordinates of the input position may be detected in detail by the first sensing in the second mode.

The position detection in the second mode is executed after the position detection in the first mode in the above example, but it is possible to execute the position detection only in the second mode. A structure of executing the position detection only in the second mode can be adopted by arranging the common electrode in a matrix instead of forming the common electrode into the shape of strips.

With respect to the second sensing (also called pressure detection) for detecting pressure data, the liquid crystal display device DSP can detect pressure data (intensity and distribution of a pressure) when the input surface IS is pressed with the finger (second input means) by the second sensing using the second sensor SE2, which will be described later in detail.

The display drive and the sense drive are executed, for example, in one frame period. The sense drive includes the first sense drive and the second sense drive. For instance, one frame period is divided into a first period and a second period. In the first period, a display drive for writing a video signal to all the pixels PX in the display area DA is executed in a time-division manner (display period). In the second period following the first period, a sense drive for detecting an object in the entire display area DA is executed in a time-division manner (touch detection period or sense period).

In another instance, one frame period is further divided into a plurality of periods. The display area is also divided into a plurality of blocks and the display drive and the sense drive are executed for each block. That is, in the first period of one frame period, a first display drive for writing a video signal to pixels PX of a first display block of the display area DA is executed. In the second period following the first period, a first sense drive for detecting an object in a first sense block of the display area DA is executed. The first sense block may be equal to or different from the first display block. In a third period following the second period, a second display drive for writing a video signal to pixels of a second display block, which is different from the first display block, is executed. In a fourth period following the third period, a second sense drive for detecting an object in a second sense block, which is different from the first sense block, is executed. As just described, it is possible to write a video signal to all the pixels PX in the display area DA and detect an object in the entire display area DA by alternately executing the display drives and the sense drives in one frame period.

For example, the display drives and the first sense drives (position detection) may be alternately executed in one frame period and the last first sense drive may be replaced with the second sense drive (pressure detection). The liquid crystal display device DSP can multiply use two types of input data by executing both the first sensing and the second sensing.

It should be noted that the liquid crystal display device DSP may use only one type of input data by executing either the first sensing or the second sensing.

Some examples of the sense drive are stated above, but basically the liquid crystal display device DSP can execute sensing in the entire display area and obtain position data in one sense period (touch detection period). Otherwise, the liquid crystal display device DSP can alternately execute position detection and pressure detection in respective sense periods. Otherwise, switching between position detection and pressure detection can be executed once every several sense periods. Otherwise, pressure detection can be executed after position detection is executed for the entire display area in one sense period. Otherwise, position detection in the first mode (self-capacitive sensing mode), position detection in the second mode (mutual-capacitive sensing mode) and pressure detection may be executed in order in one sense period.

FIG. 12 is an enlarged plan view showing a part of the third area A3 outside the display area DA of the first substrate SUB1 of the liquid crystal display panel PNL including a circuit diagram showing a multiplexer MU.

As shown in FIG. 12, the source lines S are connected to the source line drive circuit SD via the multiplexer MU. The multiplexer MU comprises a plurality of control switching element groups CSWG. Each control switching element group CSWG comprises a plurality of control switching elements CSW. In the present embodiment, each control switching element group CSWG comprises three control switching elements CSW. In the present embodiment, the multiplexer MU is a ⅓ multiplexer.

The multiplexer MU is connected to the source lines S. The multiplexer MU is also connected to the source line drive circuit SD through connection lines W. The connection lines W are lines for outputting an image signal from the source line drive circuit SD to the multiplexer MU. In the present embodiment, the number of the connection lines W is one third of the number of the source lines S.

The control switching elements CSW are sequentially turned on by control signals SELR, SELG and SELB for a time-division drive of three source lines S for each output (connection line W) of the source line drive circuit SD. In other words, the control switching elements CSW are switched between a conductive state (on) and a non-conductive state (off) by the control signals SELR, SELG and SELB. The control signals SELR, SELG and SELB are supplied from the drive IC chip IC1 to the control switching elements CSW through control lines (not shown), respectively.

A signal is allowed to be transmitted from the source line drive circuit SD to the source lines S by turning on the control switching elements CSW. The signal is, for example, a video signal. The drive IC chip IC1 can simultaneously output the control signals SELR, SELG and SELB for turning off the control switching elements CSW (i.e., bringing the control switching elements CSW into the non-conductive state) and switch all the source lines S to the electrically floating state. For example, the source lines S can thereby have high impedance (Hi-Z). Alternatively, the drive IC chip IC1 can simultaneously output the control signals SELR, SELG and SELB for turning on the control switching elements CSW (i.e., bringing the control switching elements CSW into the conductive state) and set all the source lines S at ground potential (GND).

It should be noted that the liquid crystal display panel PNL can use various well-known multiplexers (selector circuits) instead of the multiplexer MU. For example, the liquid crystal display panel PNL can use a ½ multiplexer.

Otherwise, the liquid crystal display panel PNL may be formed without a multiplexer (for example, the multiplexer MU). In this case, each source line S may be connected to the source line drive circuit SD through another control switching element. For example, all the source lines S can be switched to the electrically floating state by turning off all the other control switching elements.

Next, the second sensing is described. The second sensing is executed by controlling the second sensor SE2 in either the first mode (self-capacitive sensing mode) or the second mode (mutual-capacitive sensing mode). The second sense period is different from the display period and the first sense period and is out of the display period and the first sense period. In order to execute the second sensing, at least one of a conductive member CON and a sensor electrode SEE can be added to the liquid crystal display device DSP. The second sensing in the second mode can be roughly classified into a first method and a second method. It is assumed that a target of drive is Tx2 and a target of extraction of pressure data is Rx2 in the second sensing.

<Pressure Detection in Second Mode (First Method)>

FIG. 13 is a table showing target Tx2 of drive and target Rx2 of extraction of pressure data in the case where the second sensing in the second mode is executed in the first method.

As shown in FIG. 13 and FIG. 3, target Tx2 of drive and target Rx2 of extraction of pressure data (first input pressure data) are selected in the case where the second sensing in the second mode is executed in the first method.

As target Rx2, (2) the detection electrodes DE or (5) the common electrode CE shown in FIG. 3 can be used.

However, target Rx2 is not limited to (2) and (5). A sensor electrode SEE may be provided in the liquid crystal display device DSP and selected as target Rx2. The sensor electrode SEE may be any one of the following: (1) a sensor electrode SEE which is located on a side of the cover member CG opposed to the second substrate SUB2 and is different from the detection electrodes DE; (3) a sensor electrode SEE which is located on a side of the second insulating substrate 20 opposed to the cover member CG and is different from the detection electrodes DE; (4) a sensor electrode SEE which is located on a side of the second insulating substrate 20 opposed to the first substrate SUB1; (6) a sensor electrode SEE which is located on a side of the first insulating substrate 10 opposed to the second substrate SUB2 and is different from the common electrode CE; and (7) a sensor electrode SEE which is located on a side of the first insulating substrate 10 opposed to the backlight unit BL. In this case, any one of the sensor electrodes SEE (1), (3), (4), (6) and (7) can be added to the liquid crystal display device DSP. The position of the sensor electrode SEE in the liquid crystal display device DSP can be varied as stated above.

Any one of (1) to (7) is selected as target Rx2. If the sensor electrode SEE is selected as target Rx2, the second sensor SE2 uses the sensor electrode SEE added to the liquid crystal display device DSP.

As target Tx2, (13) the frame FR or (14) the casing CA shown in FIG. 3 can be used. If (13) is selected, the frame FR functions as the conductive member CON. If (14) is selected, the casing CA functions as the conductive member CON.

However, target Tx2 is not limited to (13) and (14). A conductive layer may be provided in the liquid crystal display device DSP and selected as target Tx2. In this case, the conductive layer functions as the conductive member CON. The conductive layer may be any one of the following: (8) a conductive layer on a side of the brightness enhancement film BEF opposed to the liquid crystal display panel PNL; (9) a conductive layer between the brightness enhancement film BEF and the light diffusion sheet DI; (10) a conductive layer between the light diffusion sheet DI and the light guide LG; (11) a conductive layer between the light guide LG and the light reflector RS; and (12) a conductive layer on a side of the light reflector RS opposed to the casing CA. In this case, any one of the conductive layers (8) to (12) can be added to the liquid crystal display device DSP. The position of the conductive layer in the liquid crystal display device DSP can be varied as stated above.

Any one of (8) to (14) is selected as target Tx2. If any one of the conductive layers (8) to (12) is selected as target Tx2, the second sensor SE2 uses a conductive layer added to the liquid crystal display device DSP.

For example, if target Rx2 is (2) the detection electrodes DE or (5) the common electrode CE, the second sensor SE2 is controlled as follows:

The controller drives the conductive member CON and extracts first input pressure data from a first electrode which is either the common electrode CE or the detection electrodes DE. The first input pressure data is based on variations in a first distance between the conductive member CON and the first electrode. At this time, the controller writes a first write signal to the conductive member CON, produces a first sensor signal between the conductive member CON and the first electrode and reads, from the first electrode, first read signals indicating variations in the first sensor signal based on variations in the first distance.

In contrast, if target Rx2 is the sensor electrode SEE, the second sensor SE2 is controlled as follows:

The controller drives the conductive member CON and extracts, from the sensor electrode SEE, first input pressure data based on variations in a distance between the conductive member CON and the sensor electrode SEE. At this time, the controller writes a first write signal to the conductive member CON, produces a first sensor signal between the conductive member CON and the sensor electrode SEE and reads, from the sensor electrode SEE, first read signals indicating variations in the first sensor signal based on variations in the distance.

<Pressure Detection in Second Mode (Second Method)>

FIG. 14 is a table showing target Tx2 of drive and target Rx2 of extraction of pressure data in the case where the second sensing in the second mode is executed in the second method.

As shown in FIG. 14 and FIG. 3, target Tx2 of drive and target Rx2 of extraction of pressure data (second input pressure data) are selected in the case where the second sensing in the second mode is executed in the second method.

As target Rx2, (13) the frame FR or (14) the casing CA shown in FIG. 3 can be used. If (13) is selected, the frame FR functions as the conductive member CON. If (14) is selected, the casing CA functions as the conductive member CON. However, target Rx2 is not limited to (13) and (14). Any one of the conductive layers (8) to (12) may be provided in the liquid crystal display device DSP and selected as target Rx2. In this case, the conductive layer functions as the conductive member CON. Any one of (8) to (14) is selected as target Rx2.

As target Tx2, (2) the detection electrodes DE or (5) the common electrode CE shown in FIG. 3 can be used. However, target Tx2 is not limited to (2) and (5). Any one of the sensor electrodes SEE (1), (3), (4), (6) and (7) may be provided in the liquid crystal display device DSP and selected as target Tx2. Any one of (1) to (7) is selected as target Tx2.

For example, if target Tx2 is (2) the detection electrodes DE or (5) the common electrode CE, the second sensor SE2 is controlled as follows:

The controller drives a second electrode which is either the common electrode CE or the detection electrodes DE and extracts, from the conductive member CON, second input pressure data based on variations in a second distance between the second electrode and the conductive member CON. At this time, the controller writes a second write signal to the second electrode, produces a second sensor signal between the second electrode and the conductive member CON and reads, from the conductive member CON, second read signals indicating variations in the second sensor signal based on variations in the second distance.

In contrast, if target Tx2 is the sensor electrode SEE, the second sensor SE2 is controlled as follows:

The controller drives the sensor electrode SEE and extracts, from the conductive member CON, second input pressure data based on variations in a distance between the sensor electrode SEE and the conductive member CON. At this time, the controller writes a second write signal to the sensor electrode SEE, produces a second sensor signal between the sensor electrode SEE and the conductive member CON and reads, from the conductive member CON, second read signals indicating variations in the second sensor signal based on variations in the distance.

<Pressure Detection in First Mode>

FIG. 15 is a table showing target Tx2 of drive, target Rx2 of extraction of pressure data and a target of ground potential (conductive member CON) in the case where the second sensing in the first mode is executed.

As shown in FIG. 15 and FIG. 3, target Tx2 of drive, target Rx2 of extraction of pressure data (first input pressure data) and the target of ground potential (conductive member CON) are selected in the second sensing in the first mode. In this case, target Tx2 of drive is the same as target Rx2 of extraction of pressure data.

As target Tx2 and target Rx2, (2) the detection electrodes DE or (5) the common electrode CE shown in FIG. 3 can be used. However, targets Tx2 and Rx2 are not limited to (2) and (5). Any one of the sensor electrodes SEE (1), (3), (4), (6) and (7) may be provided in the liquid crystal display device DSP and selected as targets Tx2 and Rx2. Any one of (1) to (7) is selected as targets Tx2 and Rx2.

As the conductive member CON, (13) the frame FR or (14) the casing CA shown in FIG. 3 can be used. However, the conductive member CON is not limited to (13) and (14). Any one of the conductive layers (8) to (12) may be provided in the liquid crystal display device DSP and selected as the conductive member CON. Any one of (8) to (14) is selected as the conductive member CON.

If any one of the conductive layers (8) to (12) is selected as the conductive member CON, the conductive layer can be set at ground potential by connecting the conductive layer to a ground portion (GND) of the control module CM through a flexible printed circuit. If (13) the frame FR is selected as the conductive member CON, the frame FR can be set at ground potential by connecting the frame FR to the ground portion (GND) of the control module CM or the casing CA as necessary. If (14) the casing CA is selected as the conductive member CON, the casing CA can be connected to the ground portion (GND) of the control module CM as necessary.

For example, if targets Tx2 and Rx2 are (2) the detection electrodes DE or (5) the common electrode CE, the second sensor SE2 is controlled as follows:

The controller drives a third electrode which is either the common electrode CE or the detection electrodes DE and extracts, from the third electrode, third input pressure data based on variations in a third distance between the third electrode and the conductive member CON. At this time, the controller writes a third write signal to the third electrode, produces a third sensor signal between the third electrode and the conductive member CON and reads, from the third electrode, third read signals indicating variations in the third sensor signal based on variations in the third distance.

In contrast, if targets Tx2 and Rx2 are the sensor electrode SEE, the second sensor SE2 is controlled as follows:

The controller drives the sensor electrode SEE and extracts, from the conductive member CON, third input pressure data based on variations in a distance between the sensor electrode SEE and the conductive member CON. At this time, the controller writes a third write signal to the sensor electrode SEE, produces a third sensor signal between the sensor electrode SEE and the conductive member CON and reads, from the sensor electrode SEE, third read signals indicating variations in the third sensor signal based on variations in the distance.

Next, some examples related to the sensor-equipped liquid crystal display device DSP are described. In each example, a method of driving the liquid crystal display device DSP is also described as appropriate.

Example 1

First, a structure of a liquid crystal display device DSP of example 1 is described.

FIG. 16 is a cross-sectional view showing the structure of the sensor-equipped liquid crystal display device DSP of example 1. As shown in FIG. 16, the liquid crystal display device DSP further comprises a conductive layer CL. The conductive layer CL is provided on a side of the light reflector RS opposed to the casing. The flexible printed circuit FPC3 comprises a first branch portion FB1 and a second branch portion FB2. The first branch portion FB1 is connected to the light source LS (backlight unit BL). The second branch portion FB2 is connected to the conductive layer CL.

In example 1, the second sensing in the second mode is executed in the second method when pressure data is detected. Target Tx2 of drive and target Rx2 of extraction of pressure data constituting the second sensor SE2 is as follows:

Tx2: common electrode CE ((5) common electrode in FIG. 14)

Rx2: conductive layer CL ((12) conductive layer in FIG. 14)

The backlight unit BL is arranged at an interval from the liquid crystal display panel PNL. In example 1, an air layer or a resin layer is provided between the liquid crystal display panel PNL and the conductive layer CL. The conductive layer CL is arranged at an interval from the common electrode CE. At least a part of the interval between the conductive layer CL and the common electrode CE is formed of the air layer or the resin layer. Since the air layer or the resin layer having elasticity return force is provided, the interval between the conductive layer CL and the common electrode CE can be changed according to a load applied to the input surface IS. If the load applied to the input surface IS is removed, the interval between the conductive layer CL and the common electrode CE can regain its original size with time. A distance (second distance) from the conductive layer CL to the common electrode CE is defined as d2. The distance d2 is a distance in the third direction Z from a surface of the conductive layer CL opposed to the common electrode CE to a surface of the common electrode CE opposed to the conductive layer CL. The distance d2 is changed according to intensity of a force (pressure) applied to the cover member CG and a position to which the force is applied.

Capacitance Cp2 is present between the common electrode CE and the conductive layer CL. In other words, the conductive layer CL is capacitively coupled with the common electrode CE. Accordingly, pressure data can be detected by detecting variations in the capacitance Cp2 depending on the distance d2. Therefore, the drive unit (drive IC chip IC1) drives the common electrode CE and the detection unit (the drive IC chip IC1, the drive IC chip IC2 or the control module CM) extracts, from the conductive layer CL, pressure data (second input pressure data) based on variations in the distance d2. More specifically, the drive unit writes a second write signal Vw2 to the common electrode CE, and the detection unit produces a second sensor signal between the common electrode CE and the conductive layer CL and reads, from the conductive layer CL, second read signals Vr2 indicating variations in the second sensor signal based on variations in the distance d2.

Figure 17:
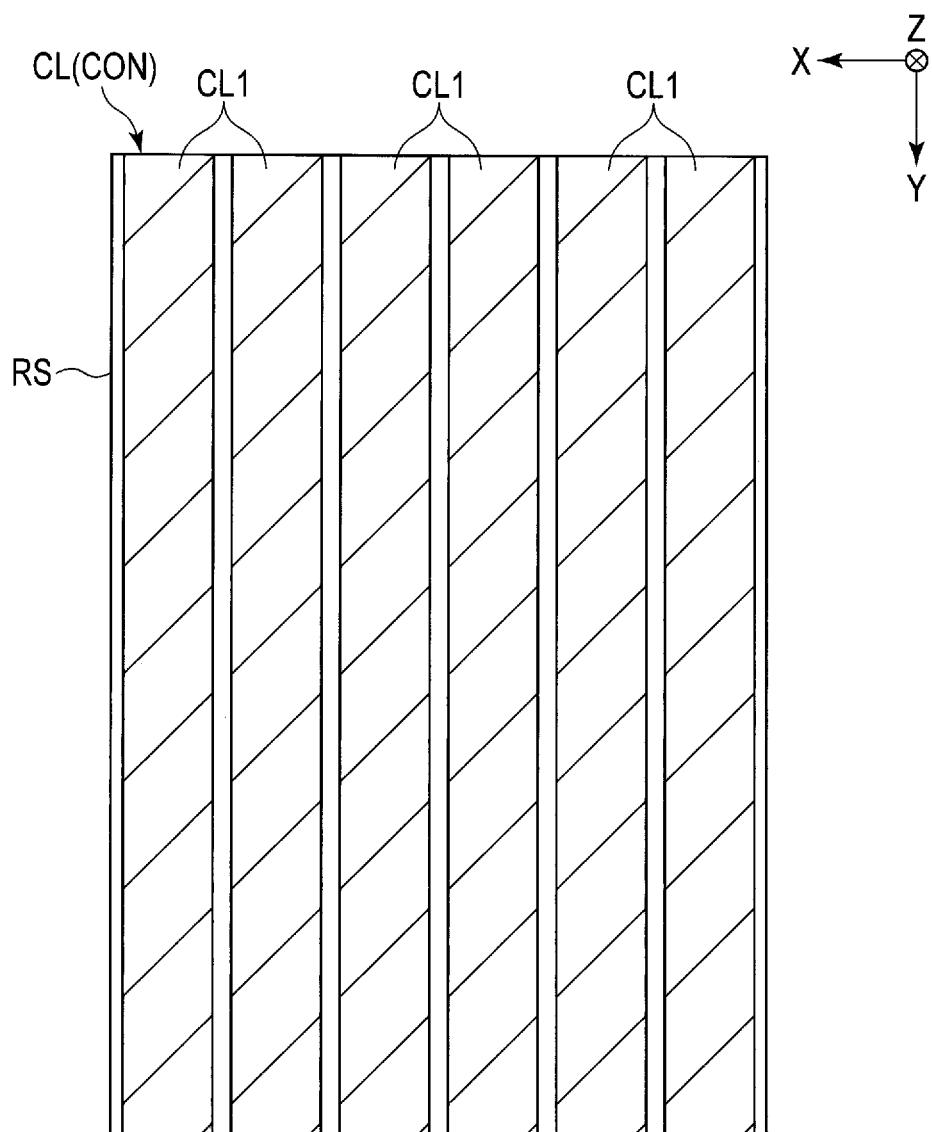
FIG. 17 is a plan view showing a conductive layer and a light reflector shown in FIG. 16.

FIG. 17 is a plan view showing the conductive layer CL and the light reflector RS shown in FIG. 16. FIG. 17 is a plan view showing the conductive layer CL, etc., in the third direction Z.

As shown in FIG. 17, the conductive layer CL as the conductive member CON comprises a plurality of divisional portions CL1 in example 1. The divisional portions CL1 are strip-shaped, extend in the second direction Y and are spaced out in the first direction X. The divisional portions CL1 cross the divisional electrodes C. Therefore, capacitance Cp2 is formed at each of the intersections of the divisional portions CL1 and the divisional electrodes C. The conductive layer CL can be formed of a transparent conductive material such as ITO, IZO or ZnO. In example 1, since the conductive layer CL is close to the casing CA relative to the light reflector RS, the conductive layer CL can be formed of a conductive material of low light transmittance such as metal. This is because the conductive layer CL has little adverse effect on visibility of display image even if the conductive layer CL is formed of metal, etc.

The divisional portions CL1 may be connected to the second branch portion FB2 indirectly via lead lines (not shown). In this case, size reduction of the second branch portion FB2 can be realized by arranging the lead lines in one area. The lead lines may be formed of a transparent conductive material in the same manner as the divisional portions CL1 but may be formed of metal instead of the transparent conductive material.

Next, a method of driving the liquid crystal display device DSP of example 1 is described.

First, a first sense drive in the second mode is described. For example, it is hereinafter assumed that the first sense drive in the second mode is executed between continuous display drives. It should be noted that a display drive means a display drive in a horizontal scan period, i.e., a drive of pixels PX aligned in a row in the first direction X.

Figure 18:
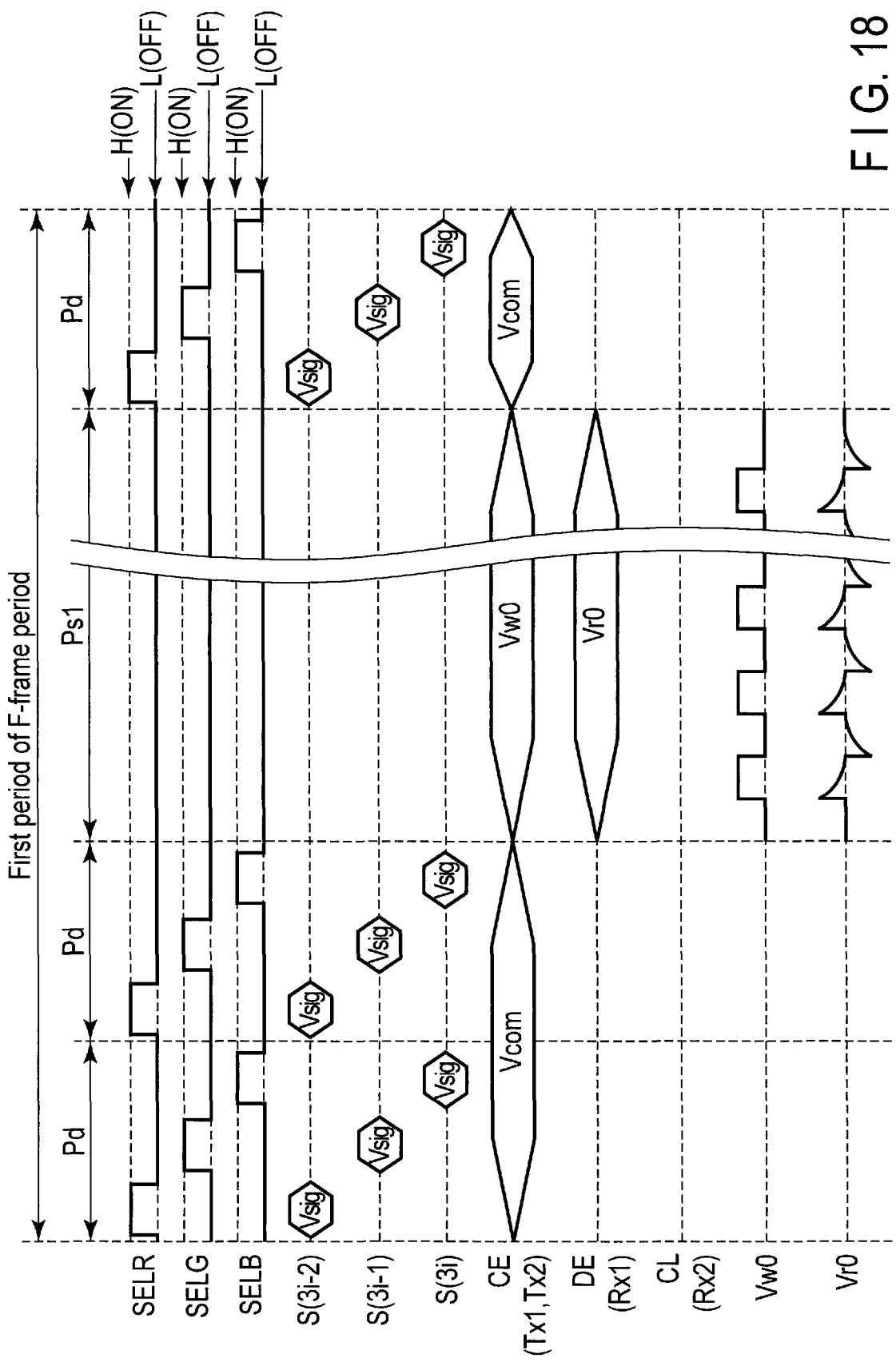
FIG. 18 is a timing chart showing a method of driving the liquid crystal display device of example 1 and showing control signals, a video signal, a common drive signal, a write signal and read signals in a first period of an $F^{th}$ frame period.

FIG. 18 is a timing chart showing the method of driving the liquid crystal display device DSP of example 1 and showing control signals SEL, a video signal Vsig, a common drive signal Vcom, a write signal Vw0 and read signals Vr0 in a first period of an $F^{th}$ frame period.

As shown in FIG. 18, FIG. 16 and FIG. 17, in the first period of an F-frame period which is the $F^{th}$ frame period, the controller (the drive IC chips IC1 and IC2 and the control module CM) executes a display drive in each display period Pd and a first sense drive in a first sense period Ps1.

In each display period Pd, the drive IC chip IC1 executes a time-division drive of the source lines S by control signals SELR, SELG and SELB, the source line drive circuit SD outputs a video signal Vsig, the common electrode drive circuit CD supplies a common drive signal Vcom to the common electrode (divisional electrodes C), and the liquid crystal display panel PNL is thereby driven. Source lines S (3$i$–2) are connected to red pixels PX, and the control signal SELR is used to switch the relationship of connection between the source lines S (3$i$–2) and the source line drive circuit SD. Source lines S (3$i$–1) are connected to green pixels PX, and the control signal SELG is used to switch the relationship of connection between the source lines S (3$i$–1) and the source line drive circuit SD. Source lines S (3$i$) are connected to blue pixels PX, and the control signal SELB is used to switch the relationship of connection between the source lines S (3$i$) and the source line drive circuit SD. In the display periods Pd, for example, the detection electrodes DE and the conductive layer CL are fixed in the electrically floating state.

In the first sense period Ps1, the drive IC chip IC1 maintains the control switching elements CSW in the non-conductive state by the control signals SELR, SELG and SELB, and brings all the source lines S to the electrically floating state (high impedance).

In the first sense period Ps1, the common electrode CE (Tx1) of the first sensor SE1 is driven. When driving the first sensor SE1, the common electrode drive circuit CD writes a write signal (sensor drive signal) Vw0 to at least one of the divisional electrodes C. The write signal Vw0 is a pulse signal. For example, a low level potential of the write signal Vw0 is equal to the potential of the common drive signal Vcom.

The drive IC chip IC2 reads read signals Vr0 from the detection electrodes DE in the first sense period Ps1. That is, position data of the input portion can be extracted from the detection electrodes DE (Rx1). The read signals Vr0 are signals indicating variations in a sensor signal produced between the divisional electrodes C and the detection electrodes DE. In the first sense period Ps1, for example, the conductive layer CL is fixed in the electrically floating state.

Next, a second sense drive in the second mode executed in the second method is described. For example, it is hereinafter assumed that the second sense drive is executed between continuous display drives.

Figure 19:
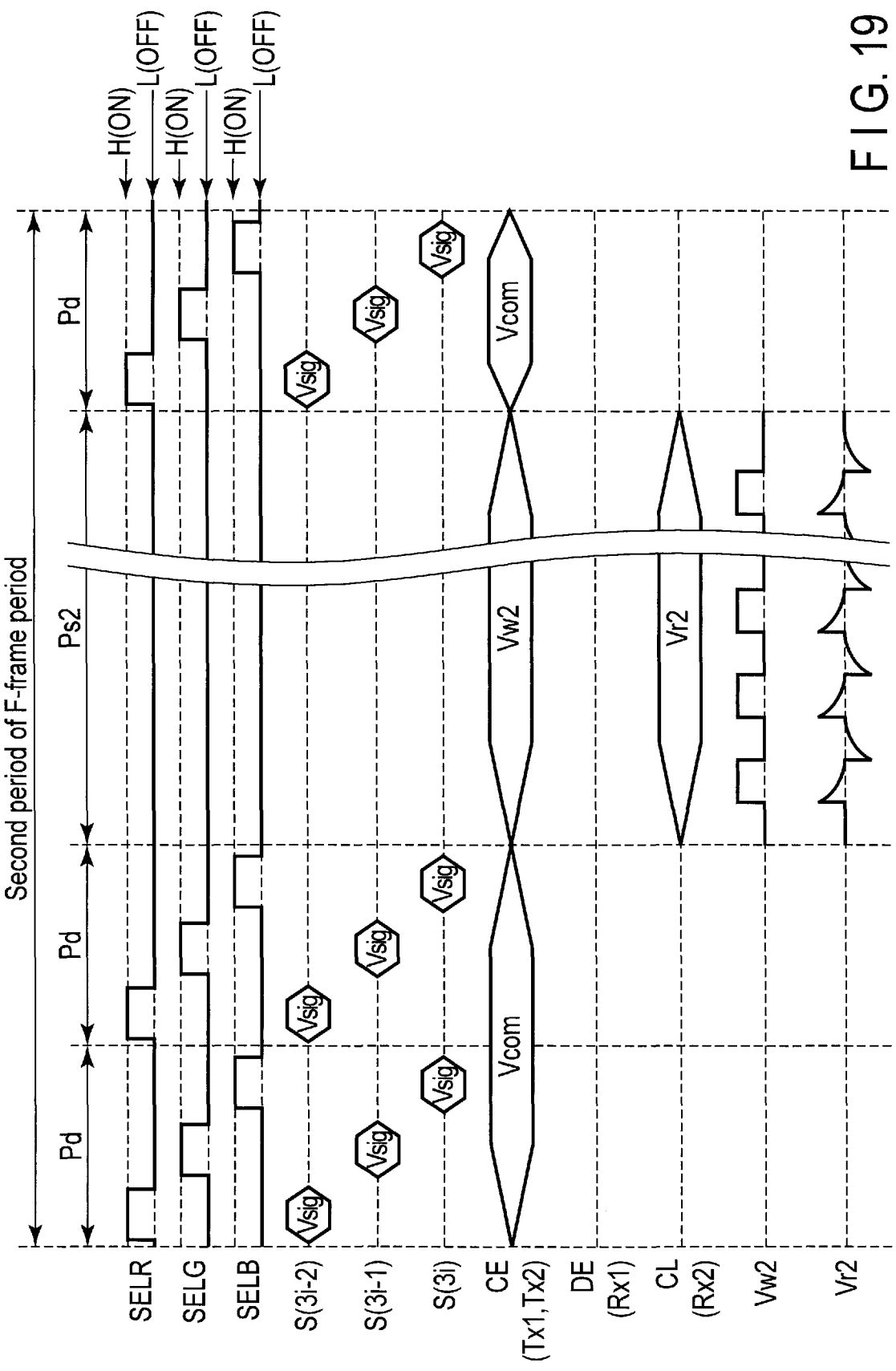
FIG. 19 is a timing chart showing the method of driving the liquid crystal display device of example 1 and showing the control signals, the video signal, the common drive signal, a second write signal and second read signals in a second period of the $F^{th}$ frame period.

FIG. 19 is a timing chart showing the method of driving the liquid crystal display device DSP of example 1 and showing the control signals SEL, the video signal Vsig, the common drive signal Vcom, a second write signal Vw2 and second read signals Vr2 in a second period of the F$^{th}$ frame period.

As shown in FIG. 19, FIG. 16 and FIG. 17, in the second period of the F-frame period, the controller (the drive IC chips IC1 and IC2 and the control module CM) executes a display drive in each display period Pd and a second sense drive in the second sense period Ps2.

The display drive in each display period Pd is the same as the display drive described with reference to FIG. 18.

In the second sense period Ps2, the drive IC chip IC1 maintains the control switching elements CSW in the non-conductive state by the control signals SELR, SELG and SELB, and brings all the source lines S to the electrically floating state (high impedance).

In the second sense period Ps2, the common electrode CE (Tx2) of the second sensor SE2 is driven. When driving the second sensor SE2, the common electrode drive circuit CD writes a second write signal (second sensor drive signal) Vw2 to one or more or all of the divisional electrodes C. The second write signal Vw2 is a pulse signal. For example, a low level potential of the second write signal Vw2 is equal to the potential of the common drive signal Vcom.

The detection unit (the drive IC chip IC1, the drive IC chip IC2 or the control module CM) reads second read signals Vr2 from the conductive layer CL (one or more or all of the divisional portions CL1) in the second sense period Ps2. That is, pressure data (second input pressure data) of the pressed portion can be extracted from the conductive layer CL (Rx2). The second read signals Vr2 are signals indicating variations in a second sensor signal produced between the divisional electrodes C and the divisional portions CL1. In the second sense period Ps2, for example, the detection electrodes DE are fixed in the electrically floating state.

Example 2

Next, a structure of a liquid crystal display device DSP of example 2 is described.

Figure 20:
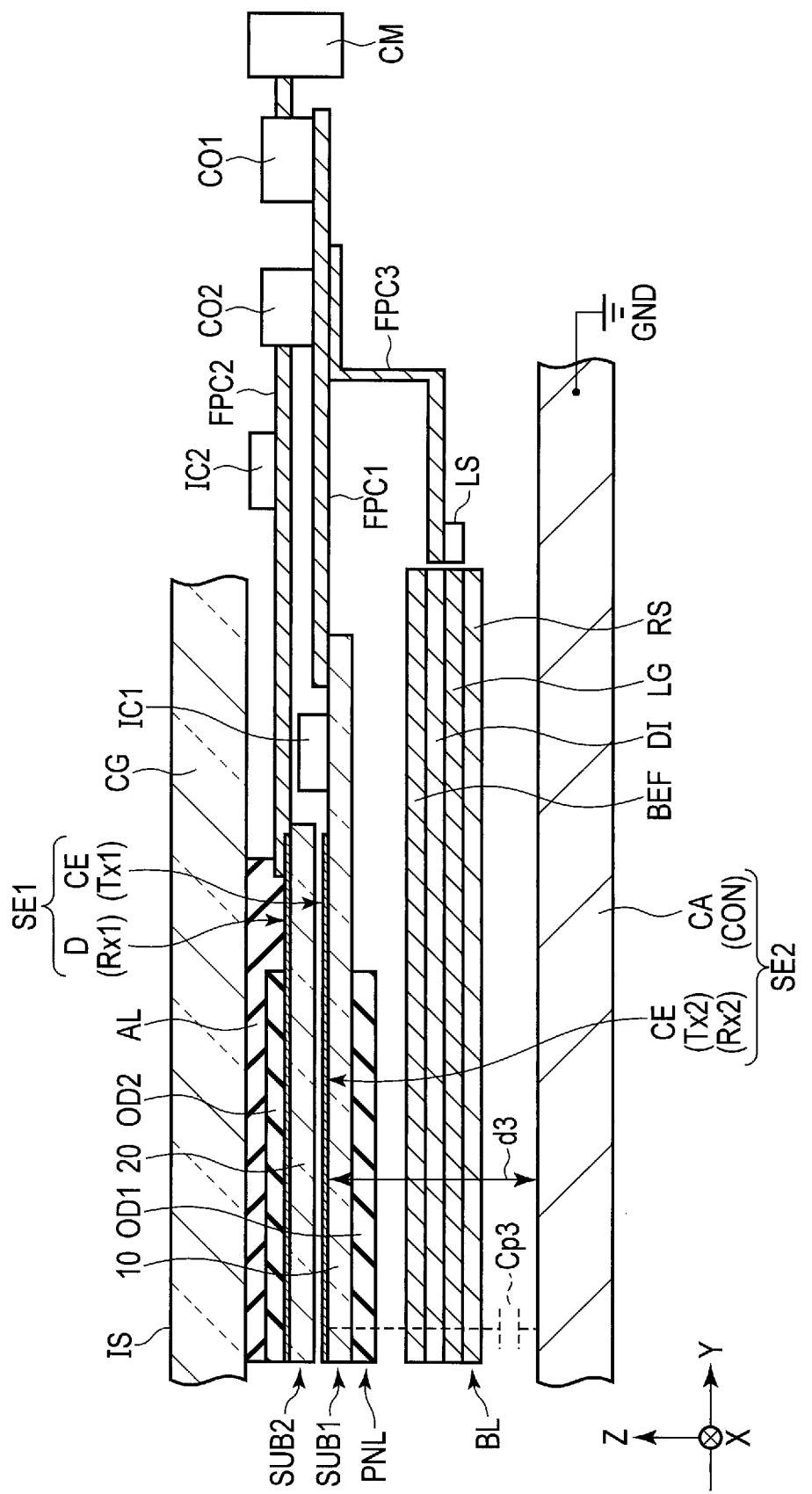
FIG. 20 is a cross-sectional view showing a structure of a sensor-equipped liquid crystal display device of example 2 of the embodiment.

FIG. 20 is a cross-sectional view showing the structure of the sensor-equipped liquid crystal display device DSP of example 2.

As shown in FIG. 20, the casing CA is formed of aluminum as a conductive material. The potential of the casing CA is equal to ground potential of the ground portion (GND) of the control module CM. In example 2, the second sensing in the first mode is executed when pressure data is detected. Target Tx2 of drive, target Rx2 of extraction of pressure data and the target of ground potential (conductive member CON) constituting the second sensor SE2 is as follows:

Tx2: common electrode CE ((5) common electrode in FIG. 15)

Rx2: common electrode CE ((5) common electrode in FIG. 15)

CON: casing CA ((14) casing in FIG. 15)

The casing CA is provided at an interval from the liquid crystal display panel PNL. In example 2, an air layer or a resin layer is provided between the liquid crystal display panel PNL and the casing CA. That is, the liquid crystal display device DSP comprises at least one of an air layer or a resin layer between the liquid crystal display panel PNL and the backlight unit BL, and an air layer or a resin layer between the backlight unit BL and the casing CA. At least a part of an interval between the casing CA and the common electrode CE is formed of the air layer or the resin layer. Since the air layer or the resin layer is provided, the interval between the casing CA and the common electrode CE can be changed according to a load applied to the input surface IS. When the load applied to the input surface IS is removed, the interval between the casing CA and the common electrode CE can regain its original size with time. A distance (third distance) from the casing CA to the common electrode CE is defined as d3. The distance d3 is a distance in the third direction Z from a surface of the casing CA opposed to the common electrode CE to a surface of the common electrode CE opposed to the casing CA. The distance d3 is changed according to intensity of a force (pressure) applied to the cover member CG and a position to which the force is applied.

Capacitance Cp3 is present between the common electrode CE and the casing CA. In other words, the common electrode CE is capacitively coupled with the casing CA. Accordingly, pressure data can be detected by detecting variations in the capacitance Cp3 depending on the distance d3. Therefore, the drive unit (drive IC chip IC1) drives the common electrode CE and the detection unit (drive IC chip IC1) extracts, from the common electrode CE, pressure data (third input pressure data) based on variations in the distance d3. More specifically, the drive unit writes a third write signal Vw3 to the common electrode CE, and the detection unit produces a third sensor signal between the common electrode CE and the casing CA and reads, from the common electrode CE, third read signals Vr3 indicating variations in the third sensor signal based on variations in the distance d3.

Next, a method of driving the liquid crystal display device DSP of example 2 is described.

First, a first sense drive in the second mode is described.

Figure 21:
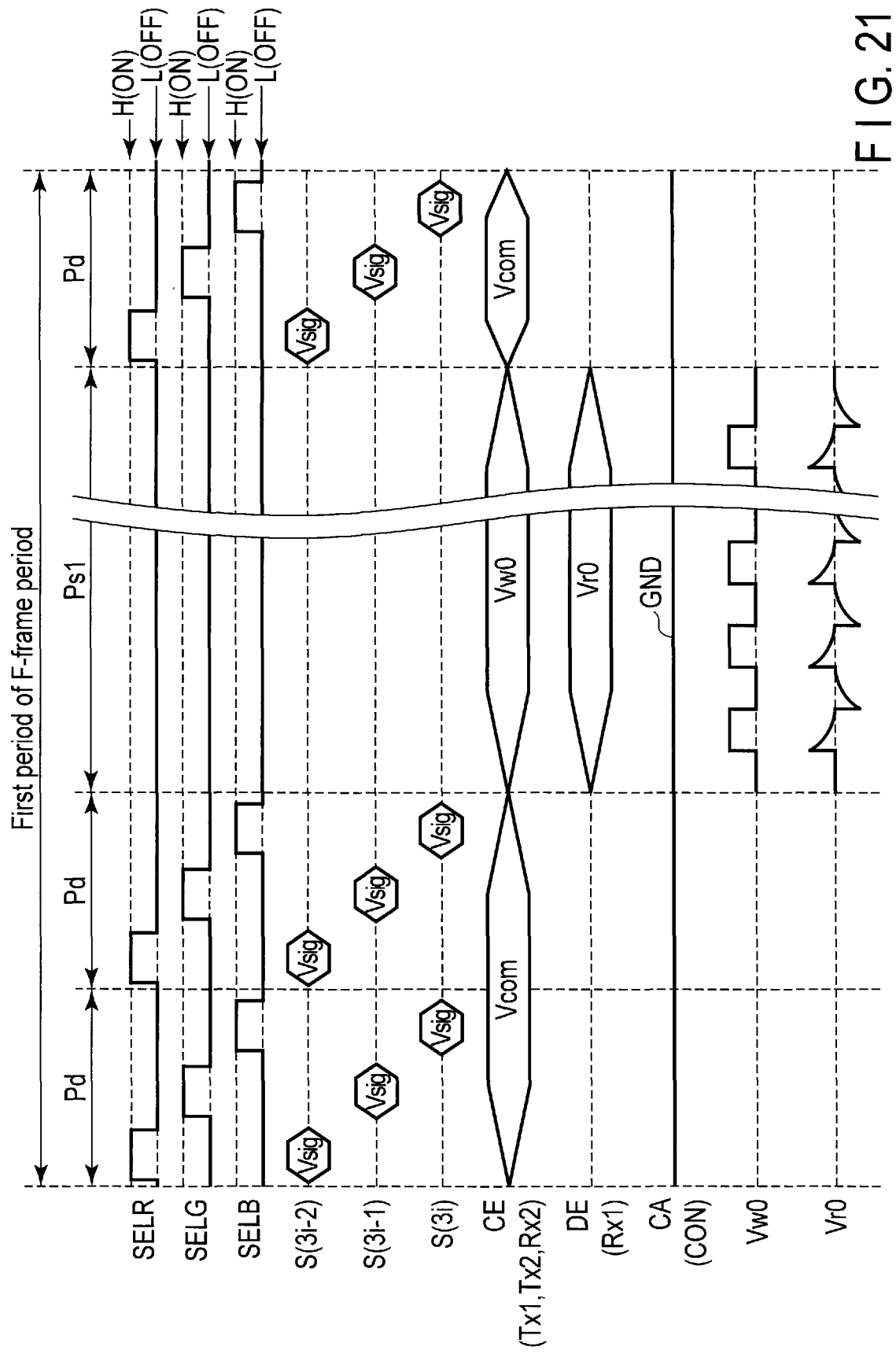
FIG. 21 is a timing chart showing a method of driving the liquid crystal display device of example 2 and showing control signals, a video signal, a common drive signal, a write signal and read signals in a first period of an $F^{th}$ frame period.

FIG. 21 is a timing chart showing the method of driving the liquid crystal display device DSP of example 2 and showing control signals SEL, a video signal Vsig, a common drive signal Vcom, a write signal Vw0, and read signals Vr0 in a first period of an $F^{th}$ frame period.

As shown in FIG. 21 and FIG. 20, in the first period of an F-frame period which is the $F^{th}$ frame period, the controller (the drive IC chips IC1 and IC2 and the control module CM) executes a display drive in each display period Pd and a first sense drive in a first sense period Ps1. The display drive and the first sense drive in example 2 are executed in the same manner as example 1. The potential of the casing CA is equal to ground potential of the ground portion (GND) of the control module CM.

Next, a second sense drive in the first mode is described. For example, it is hereinafter assumed that the second sense drive is executed between continuous display drives.

Figure 22:
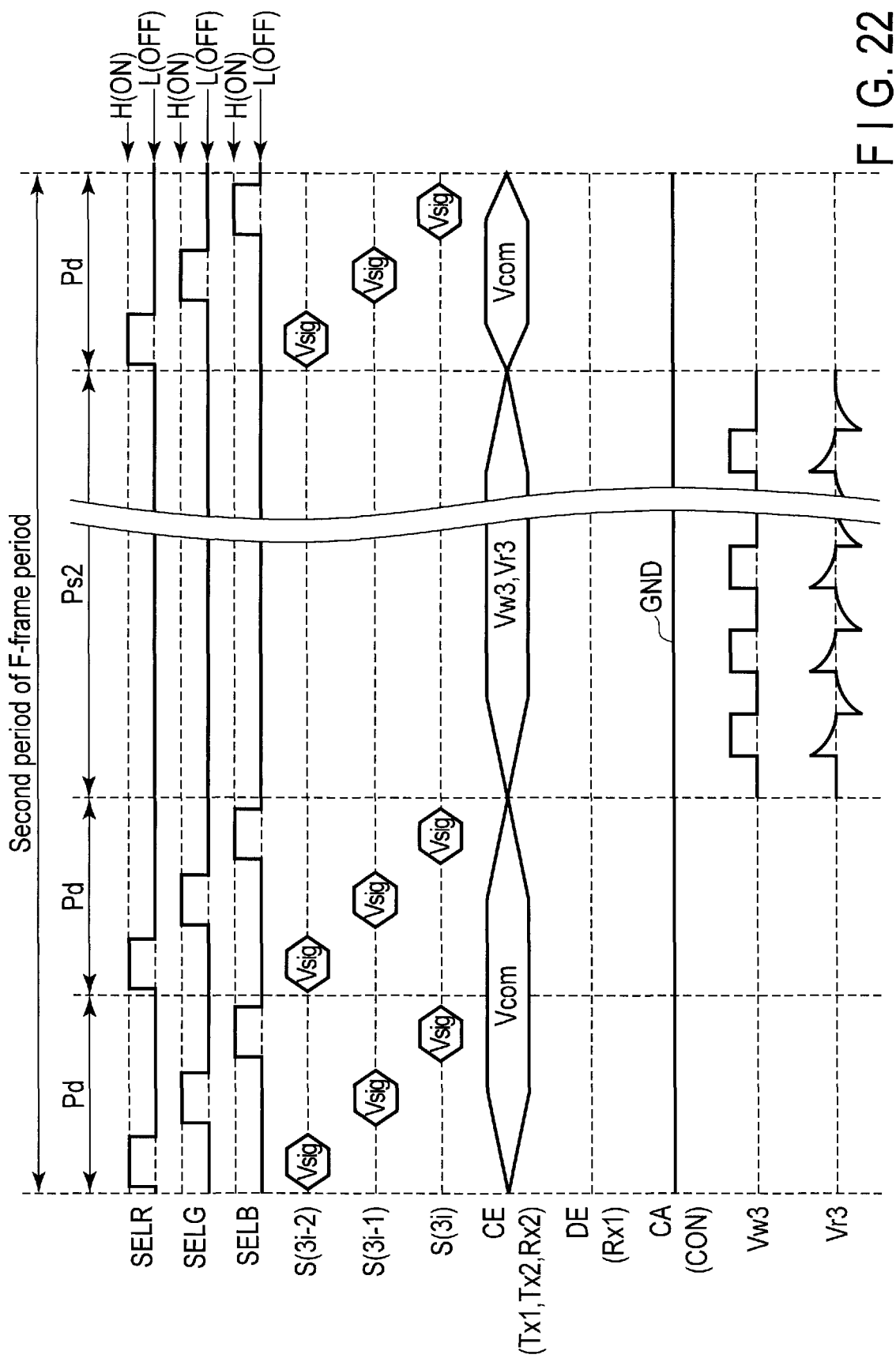
FIG. 22 is a timing chart showing the method of driving the liquid crystal display device of example 2 and showing the control signals, the video signal, the common drive signal, a third write signal and third read signals in a second period of the $F^{th}$ frame period.

FIG. 22 is a timing chart showing the method of driving the liquid crystal display device DSP of example 2 and showing the control signals SEL, the video signal Vsig, the common drive signal Vcom, a third write signal Vw3 and third read signals Vr3 in a second period of the $F^{th}$ frame period.

As shown in FIG. 22 and FIG. 20, in the second period of the F-frame period, the controller (the drive IC chips IC1 and IC2 and the control module CM) executes a display drive in each display period Pd and a second sense drive in the second sense period Ps2.

The display drive in each display period Pd is the same as the display drive described above.

In the second sense period Ps2, the drive IC chip IC1 maintains the control switching elements CSW in the non-conductive state by the control signals SELR, SELG and SELB, and brings all the source lines S to the electrically floating state (high impedance).

In the second sense period Ps2, the common electrode CE (Tx2) of the second sensor SE2 is driven. When driving the second sensor SE2, the common electrode drive circuit CD writes a third write signal (third sensor drive signal) Vw3 to one or more or all of the divisional electrodes C. The third write signal Vw3 is a pulse signal. For example, a low level potential of the third write signal Vw3 is equal to the potential of the common drive signal Vcom.

The detection unit (the drive IC chip IC1, the drive IC chip IC2 or the control module CM) reads third read signals Vr3 from the common electrode CE (one or more or all of the divisional electrodes C) in the second sense period Ps2. That is, pressure data (third input pressure data) of the pressed portion can be extracted from the common electrode CE (Rx2). The third read signals Vr3 are signals indicating variations in a third sensor signal produced between the divisional electrodes C and the casing CA. In the second sense period Ps2, for example, the detection electrodes DE are fixed in the electrically floating state. The potential of the casing CA is equal to ground potential of the ground portion (GND) of the control module CM.

Example 3

Next, a structure of a liquid crystal display device DSP of example 3 is described.

Figure 23:
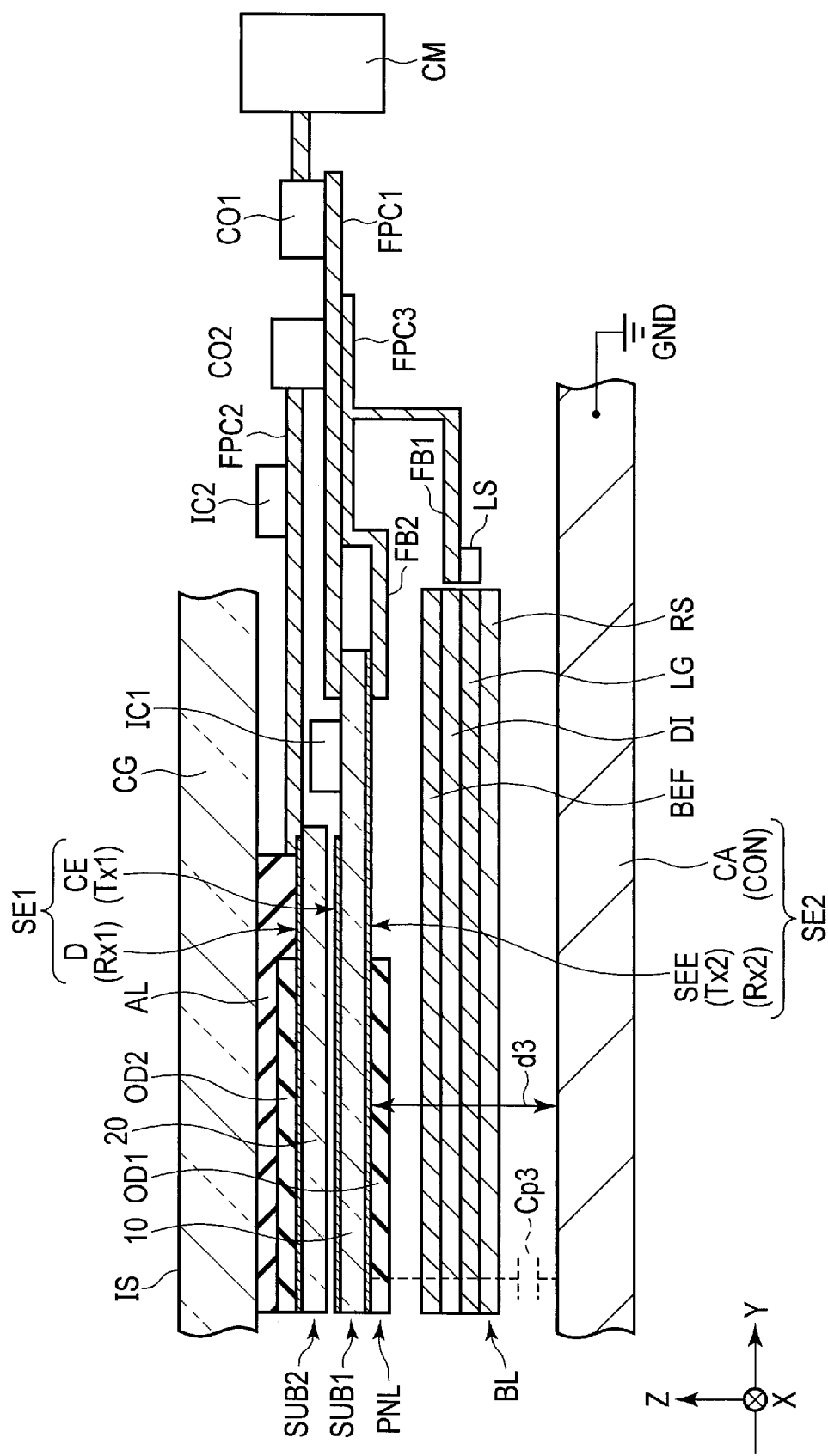
FIG. 23 is a cross-sectional view showing a structure of a sensor-equipped liquid crystal display device of example 3 of the embodiment.

FIG. 23 is a cross-sectional view showing the structure of the sensor-equipped liquid crystal display device DSP of example 3. As shown in FIG. 23, the liquid crystal display device DSP further comprises a sensor electrode SEE. The sensor electrode SEE is provided on a side of the first insulating substrate 10 opposed to the backlight unit BL. The flexible printed circuit FPC3 comprises a first branch portion FB1 and a second branch portion FB2. The first branch portion FB1 is connected to the light source LS (backlight unit BL). The second branch portion FB2 is connected to the sensor electrode SEE.

The casing CA is formed of aluminum as a conductive material. The potential of the casing CA is equal to ground potential of the ground portion (GND) of the control module CM.

In example 3, the second sensing in the first mode is executed when pressure data is detected. Target Tx2 of drive, target Rx2 of extraction of pressure data and the target of ground potential (conductive member CON) constituting the second sensor SE2 is as follows:

Tx2: sensor electrode SEE ((7) sensor electrode in FIG. 15)

Rx2: sensor electrode SEE ((7) sensor electrode in FIG. 15)

CON: casing CA ((14) casing in FIG. 15)

The casing CA is provided at an interval from the liquid crystal display panel PNL. In example 3, an air layer or a resin layer is provided between the liquid crystal display panel PNL and the casing CA. That is, the liquid crystal display device DSP comprises at least one of an air layer or a resin layer between the liquid crystal display panel PNL and the backlight unit BL, and an air layer or a resin layer between the backlight unit BL and the casing CA. At least a part of an interval between the casing CA and the sensor electrode SEE is formed of the air layer or the resin layer. Since the air layer or the resin layer is provided, the interval between the casing CA and the sensor electrode SEE can be changed according to a load applied to the input surface IS. When the load applied to the input surface IS is removed, the interval between the casing CA and the sensor electrode SEE can regain its original size with time. A distance (third distance) from the casing CA to the sensor electrode SEE is defined as d3. The distance d3 is a distance in the third direction Z from a surface of the casing CA opposed to the sensor electrode SEE to a surface of the sensor electrode SEE opposed to the casing CA. The distance d3 is changed according to intensity of a force (pressure) applied to the cover member CG and a position to which the force is applied.

Capacitance Cp3 is present between the sensor electrode SEE and the casing CA. In other words, the sensor electrode SEE is capacitively coupled with the casing CA. Accordingly, pressure data can be detected by detecting variations in the capacitance Cp3 depending on the distance d3. Therefore, the drive unit (the drive IC chip IC1, the drive IC chip IC2 or the control module CM) drives the sensor electrode SEE and the detection unit (the drive IC chip IC1, the drive IC chip IC2 or the control module CM) extracts, from the sensor electrode SEE, pressure data (third input pressure data) based on variations in the distance d3. More specifically, the drive unit writes a third write signal Vw3 to the sensor electrode SEE, and the detection unit produces a third sensor signal between the sensor electrode SEE and the casing CA and reads, from the sensor electrode SEE, third read signals Vr3 indicating variations in the third sensor signal based on variations in the distance d3.

FIG. 24 is a plan view showing the sensor electrode SEE and the casing CA shown in FIG. 23. FIG. 24 is a plan view showing the sensor electrode SEE, etc., in the opposite direction of the third direction Z.

As shown in FIG. 24, the sensor electrode SEE comprises a plurality of divisional electrodes SEE1 in example 3. The divisional electrodes SEE1 are rectangular-shaped and arranged at intervals in a matrix in the first direction X and the second direction Y. Therefore, the capacitance Cp3 is formed between each divisional electrode SEE1 and the casing CA. The sensor electrode SEE is formed of a transparent conductive material such as ITO, IZO or ZnO.

The divisional electrodes SEE1 may be connected to the second branch portion FB2 indirectly via lead lines (not shown). The lead lines may be formed of a transparent conductive material in the same manner as the divisional electrodes SEE1 but may be formed of metal instead of the transparent conductive material. The casing CA has a conductive surface opposed to the divisional electrodes SEE1 and formed continuously.

Next, a method of driving the liquid crystal display device DSP of example 3 is described.

First, a first sense drive in the second mode is described.

Figure 25:
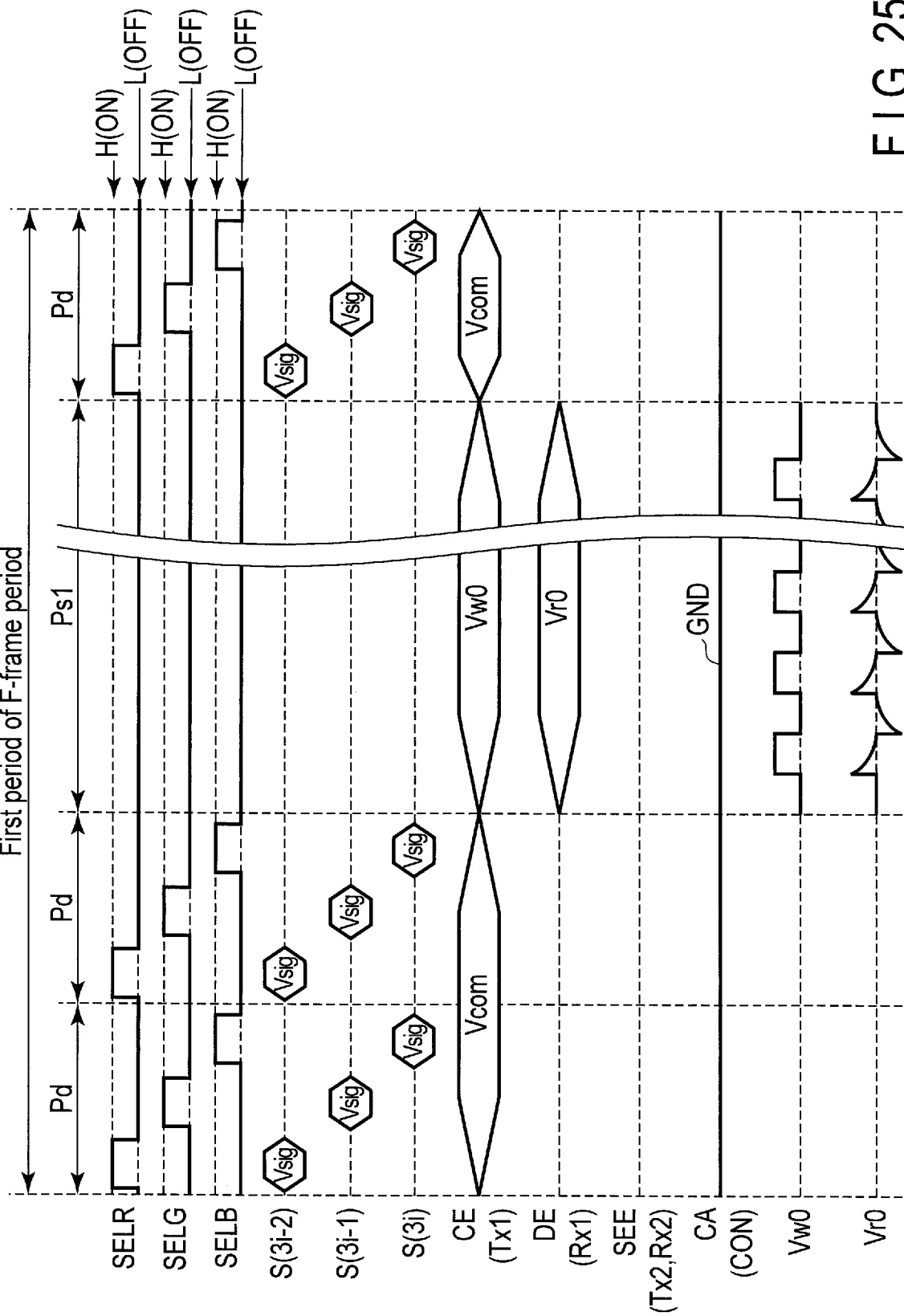
FIG. 25 is a timing chart showing a method of driving the liquid crystal display device of example 3 and showing control signals, a video signal, a common drive signal, a write signal and read signals in a first period of an $F^{th}$ frame period.

FIG. 25 is a timing chart showing the method of driving the liquid crystal display device DSP of example 3 and showing control signals SEL, a video signal Vsig, a common drive signal Vcom, a write signal Vw0 and read signals Vr0 in a first period of an $F^{th}$ frame period.

As shown in FIG. 25, FIG. 23 and FIG. 24, in the first period of an F-frame period which is the $F^{th}$ frame period, the controller (the drive IC chips IC1 and IC2 and the control module CM) executes a display drive in each display period Pd and a first sense drive in a first sense period Ps1. The display drive and the first sense drive in example 3 are executed in the same manner as examples 1 and 2. The potential of the casing CA is equal to ground potential of the ground portion (GND) of the control module CM.

Next, a second sense drive in the first mode is described. For example, it is hereinafter assumed that the second sense drive is executed between continuous display drives.

Figure 26:
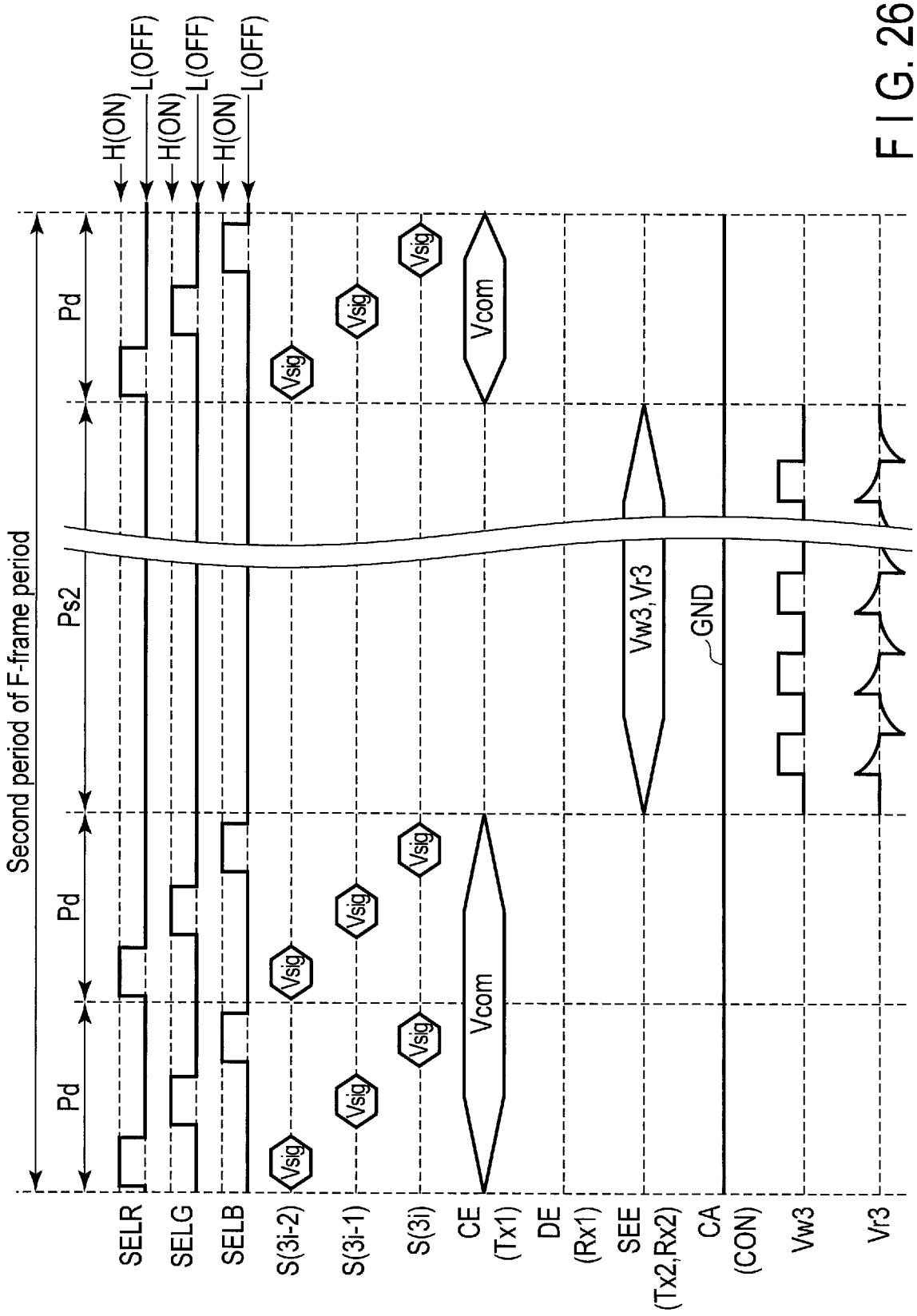
FIG. 26 is a timing chart showing the method of driving the liquid crystal display device of example 3 and showing the control signals, the video signal, the common drive signal, a third write signal and third read signals in a second period of the $F^{th}$ frame period.

FIG. 26 is a timing chart showing the method of driving the liquid crystal display device DSP of example 3 and showing the control signals SEL, the video signal Vsig, the common drive signal Vcom, the third write signal Vw3 and the third read signals Vr3 in a second period of the $F^{th}$ frame period.

As shown in FIG. 26, FIG. 23 and FIG. 24, in the second period of the F-frame period, the controller (the drive IC chips IC1 and IC2 and the control module CM) executes a display drive in each display period Pd and a second sense drive in a second sense period Ps2.

The display drive in each display period Pd is the same as the display drive described above.

In the second sense period Ps2, the drive IC chip IC1 maintains the control switching elements CSW in the non-conductive state by the control signals SELR, SELG and SELB, and brings all the source lines S to the electrically floating state (high impedance).

In the second sense period Ps2, the sensor electrode SEE (Tx2) of the second sensor SE2 is driven. When driving the second sensor SE2, the drive unit (the drive IC chip IC1, the drive IC chip IC2 or the control module CM) writes a third write signal (third sensor drive signal) Vw3 to one or more or all of the divisional electrodes SEE1. The third write signal Vw3 is a pulse signal. For example, a low level potential of the third write signal Vw3 is equal to the potential of the common drive signal Vcom.

The detection unit (the drive IC chip IC1, the drive IC chip IC2 or the control module CM) reads third read signals Vr3 from the sensor electrode SEE (one or more or all of the divisional electrodes SEE1) in the second sense period Ps2. That is, pressure data (third input pressure data) of the pressed portion can be extracted from the sensor electrode SEE (Rx2). The third read signals Vr3 are signals indicating variations in a third sensor signal produced between the sensor electrode SEE and the casing CA. In the second sense period Ps2, for example, the detection electrodes DE are fixed in the electrically floating state. The potential of the casing CA is equal to ground potential of the ground portion (GND) of the control module CM.

According to the sensor-equipped liquid crystal display device DSP of the embodiment configured above and the method of driving the same, the liquid crystal display device DSP comprises two types of sensors, i.e., the first sensor SE1 and the second sensor SE2. The first sensor SE1 can detect position data of a position on the input surface IS that a finger or the like has touched or approached. The second sensor SE2 can detect intensity of a force (pressure) applied to the input surface IS. The second sensor SE2 can also detect a position on the input surface IS to which the force is applied depending on the structure of the second sensor SE2.

For example, the liquid crystal display device DSP capable of executing first sensing using the first sensor SE1 and second sensing using the second sensor SE2 makes it possible to use various applications. Some applications are described below as an example.

(Application 1)

As shown in FIG. 27, when a character is input to the input surface IS of the liquid crystal display device DSP using a stylus that functions as both the first input means and the second input means, the liquid crystal display device DSP can display data on a writing pressure. In this example, the liquid crystal display device DSP displays a narrow line L1 when a line is input to the input surface IS with a low writing pressure. In contrast, the liquid crystal display device DSP displays a line L2 which is relatively wider than the line L1 when a line is input to the input surface IS with a high writing pressure. The liquid crystal display device DSP can display an image (video) as if it was written with a brush.

(Application 2)

As shown in FIG. 28, when a certain area on the input surface IS is pressed with the finger, the liquid crystal display device DSP can specify a position and a pressure of the press. The liquid crystal display device DSP can deal with presses with two or more fingers.

As described above, the sensor-equipped liquid crystal display device DSP capable of detecting input position and pressure and a method of driving the same can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shape of each of the conductive layer CL and the sensor electrode SEE is not limited to the above example and may be variously changed. The sensor electrode SEE is described below as a representative.

As shown in FIG. 29, the sensor electrode SEE may comprise a plurality of divisional electrodes SEE1 located outside the display area DA. In the example illustrated, the divisional electrodes SEE1 are located at the four corners of the input surface IS. In this case, the sensor electrode SEE may be formed of a transparent conductive material or a conductive material of low light transmittance. Each divisional electrode SEE1 is driven and pressure data is extracted from each divisional electrode SEE1.

If at least a part of the divisional electrodes SEE1 should be located in the display area DA, a dummy unit may be arranged at an interval from the divisional electrodes SEE1 in the display area DA. It should be noted that the dummy unit is in the electrically floating state. In this case, the outline and the shape of the divisional electrodes SEE1 can be made almost invisible to the user's eye by forming the divisional electrodes SEE1 and the dummy unit of a transparent conductive material.

The sensor electrode SEE may comprise five or more divisional electrodes SEE1. Pressure data of an arbitrary position can be detected by increasing the number of divisional electrodes SEE1.

As shown in FIG. 30, the sensor electrode SEE may be located outside the display area DA and formed into a rectangular frame shape. At least a part of the sensor electrode SEE may be located in the display area DA.

As shown in FIG. 31, the sensor electrode SEE is not necessarily divided and may be a single planar electrode continuously formed in the display area DA.

The divisional electrodes C may extend in the second direction Y and the detection electrodes DE may extend in the first direction X. In order to make distance d such as distances d2 and d3 variable, the air layer may be provided between objects as described above, but the resin layer may be provided instead of the air layer. A member provided between objects is not limited to the resin layer but may be an elastic insulating member.

The drive IC chip IC1 and the drive IC chip IC2 may be integrally formed. In other words, the drive IC chip IC1 and the drive IC chip IC2 may be integrated on a single drive IC chip as long as the single drive IC chip can drive the liquid crystal display panel PNL, the first sensor SE1 and the second sensor SE2, detect position data from the first sensor SE1 and detect pressure data from the second sensor SE2.

The controller is not limited to the drive IC chips IC1 and IC2 and the control module CM and may be variously changed as long as it can electrically control the liquid crystal display panel PNL, the first sensor SE1 and the second sensor SE2.

In the above embodiment, the liquid crystal display device is described as an example of the display device. However, the embodiment can be applied to any flatpanel display device, for example, a selfluminous display device such as an organic electroluminescent display device, an electronic paper display device having an electrophoresis element, or the like. It is needless to say that the embodiment can be applied to middle or small liquid crystal display devices and large liquid crystal display devices without particular limitation.

What is claimed is:

1. A sensor-equipped display device comprising:

a display panel comprising a common electrode;

a conductive member arranged at the back of the display panel;

a backlight unit which emits light toward the display panel; and a controller, wherein the backlight unit comprises a light guide opposed to the display panel at an interval from the display panel and located between the display panel and the conductive member, and a light source which emits light toward the light guide, the display panel comprises a first substrate located between the backlight unit and the common electrode, and a second substrate opposed to the first substrate via the common electrode and a polarizer located between the backlight unit and the first substrate, a first flexible printed circuit is connected to the display panel, a second flexible printed circuit is connected to the conductive member and a back side of the first flexible printed circuit, the controller is connected to the first flexible printed circuit, the common electrode is connected to the controller via the first flexible printed circuit, the conductive member is connected to the controller via the second and first printed circuits, in a display period during which an image is displayed, the controller drives the common electrode, in a sense period which is different from the display period, the controller drives the conductive member and extracts input pressure data based on a variation in a distance between the common electrode and the conductive member from the common electrode, the common electrode comprises a plurality of divisional electrodes extending in a first direction and arranged at intervals, the conductive member comprises a plurality of divisional portions extending in a second direction crossing the first direction and arranged at intervals, and when the controller extracts the input pressure data from the common electrode, the controller drives at least one of the divisional portions and extracts the input pressure data from at least one of the divisional electrodes, the backlight unit comprises a plurality of light source facing to the light guide, the second flexible printed circuit comprises a first branch portion and a second branch portion, the first branch portion is connected to the light source, and the second branch portion is connected to the conductive member.

2. The sensor-equipped display device of claim 1, wherein the conductive member is a casing which accommodates at least the backlight unit.

3. The sensor-equipped display device of claim 1, wherein the interval is an air layer provided between the display panel and the light guide.

4. A sensor-equipped display device comprising:
a display panel comprising a common electrode;
a conductive member arranged at the back of the display panel;
a backlight unit which emits light toward the display panel; and
a controller,
wherein
the backlight unit comprises a light guide opposed to the display panel at an interval from the display panel and located between the display panel and the conductive member, and a light source which emits light toward the light guide,
the display panel comprises a first substrate located between the backlight unit and the common electrode, and a second substrate opposed to the first substrate via the common electrode and a polarizer located between the backlight unit and the first substrate,
a first flexible printed circuit is connected to the display panel,
a second flexible printed circuit is connected to the conductive member and a back side of the first flexible printed circuit,
the controller is connected to the first flexible printed circuit,
the common electrode is connected to the controller via the first flexible printed circuit,
the conductive member is connected to the controller via the second and first printed circuits,
in a display period during which an image is displayed, the controller drives the common electrode,
in a sense period which is different from the display period, the controller drives the common electrode and extracts input pressure data based on a variation in a distance between the common electrode and the conductive member from the conductive member,
the common electrode comprises a plurality of divisional electrodes extending in a first direction and arranged at intervals,
the conductive member comprises a plurality of divisional portions extending in a second direction crossing the first direction and arranged at intervals, and
when the controller extracts the input pressure data from the conductive member, the controller drives at least one of the divisional electrodes and extracts the input pressure data from at least one of the divisional portions,
the backlight unit comprises a plurality of light source facing to the light guide,
the second flexible printed circuit comprises a first branch portion and a second branch portion,
the first branch portion is connected to the light source, and
the second branch portion is connected to the conductive member.

5. The sensor-equipped display device of claim 4, wherein
when the controller extracts the input pressure data from the conductive member, the controller provides a write signal to the common electrode to produce a sensor signal between the common electrode and the conductive member and reads, from the conductive member, a read signal indicating a variation in the sensor signal based on the variation in the distance.

\* \* \* \* \*